(12) United States Patent
Sittler et al.

(10) Patent No.: US 8,898,036 B2
(45) Date of Patent: Nov. 25, 2014

(54) PROCESS VARIABLE TRANSMITTER WITH ACCELERATION SENSOR

(75) Inventors: Fred C. Sittler, Excelsior, MN (US); Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/834,221

(22) Filed: Aug. 6, 2007

(65) Prior Publication Data

US 2009/0043530 A1 Feb. 12, 2009

(51) Int. Cl.
*G06F 11/30* (2006.01)
*G01F 1/20* (2006.01)
*G01H 1/00* (2006.01)
*G01M 13/02* (2006.01)

(52) U.S. Cl.
CPC .............. *G01H 1/00* (2013.01); *G01M 13/028* (2013.01)
USPC ........................................ 702/184; 73/861.18

(58) Field of Classification Search
USPC ...................... 702/182–185, 188–189, 56, 85, 702/98–100, 104, 127, 138, 141, 33–36, 45, 702/47, 50, 52–54, 81, 84, 105, 140; 700/174, 280, 282, 9, 10, 48–50, 175, 700/177; 73/861.18, 861.355, 861.356, 73/1.16, 1.35, 1.37, 1.57, 1.59, 1.82, 1.83, 73/37, 49, 521, 570, 577, 649; 706/2, 6, 706/15, 17, 21–23, 903–904, 912
See application file for complete search history.

(56) References Cited

U.S. PATENT DOCUMENTS

| | | | |
|---|---|---|---|
| 2,533,339 A | 12/1950 | Willenborg | 177/311 |
| 3,012,432 A | 12/1961 | Moore et al. | 73/40 |
| 3,096,434 A | 7/1963 | King | 235/151 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,404,264 A | 10/1968 | Kugler | 235/194 |
| 3,410,779 A | 11/1968 | Whitehead et al. | 204/408 |
| 3,468,164 A | 9/1969 | Sutherland | 73/343 |
| 3,557,621 A | 1/1971 | Ferran | 73/398 |
| 3,590,370 A | 6/1971 | Fleischer | 324/51 |

(Continued)

FOREIGN PATENT DOCUMENTS

| | | |
|---|---|---|
| CA | 999950 | 11/1976 |
| CN | 1185841 | 6/1998 |

(Continued)

OTHER PUBLICATIONS

Awawdeh et al., Wireless Sensing of Flow-Induced Vibrations for Pipeline Integrity Monitoring, 2006 IEEE, pp. 114-117.*

(Continued)

*Primary Examiner* — Toan Le
(74) *Attorney, Agent, or Firm* — Westman, Champlin & Koehler, P.A.

(57) ABSTRACT

A process variable transmitter for use in an industrial process control or monitoring system includes a transmitter housing and a process variable sensor having a sensor output related to a process variable. An accelerometer is coupled to the transmitter and provides an accelerometer output related to acceleration. Diagnostic circuitry provides a diagnostic output as a function of the sensor output and the accelerometer output.

41 Claims, 4 Drawing Sheets

(56) References Cited

U.S. PATENT DOCUMENTS

| | | | |
|---|---|---|---|
| 3,618,592 A | 11/1971 | Stewart | 128/2.05 R |
| 3,633,053 A | 1/1972 | Peters | 310/15 |
| 3,688,190 A | 8/1972 | Blum | 324/61 R |
| 3,691,842 A | 9/1972 | Akeley | 73/398 C |
| 3,697,835 A | 10/1972 | Satori | 317/246 |
| 3,701,280 A | 10/1972 | Stroman | 73/194 |
| 3,808,480 A | 4/1974 | Johnston | 317/256 |
| 3,849,637 A | 11/1974 | Caruso et al. | 235/151 |
| 3,855,858 A | 12/1974 | Cushing | 73/194 EM |
| 3,924,069 A | 12/1975 | Fletcher et al. | 375/333 |
| 3,924,219 A | 12/1975 | Braun | 338/34 |
| 3,948,098 A | 4/1976 | Richardson et al. | 73/861.24 |
| 3,952,759 A | 4/1976 | Ottenstein | 137/12 |
| 3,964,296 A | 6/1976 | Matzuk | 73/67.5 |
| 3,973,184 A | 8/1976 | Raber | 324/51 |
| 4,008,619 A | 2/1977 | Alcaide et al. | 73/398 |
| 4,043,008 A | 8/1977 | Weiss et al. | 28/271 |
| RE29,383 E | 9/1977 | Gallatin et al. | 137/14 |
| 4,058,975 A | 11/1977 | Gilbert et al. | 60/39.28 |
| 4,083,031 A | 4/1978 | Pharo, Jr. | 367/135 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,237,454 A | 12/1980 | Meyer | 340/682 |
| 4,249,164 A | 2/1981 | Tivy | 340/870.3 |
| 4,250,490 A | 2/1981 | Dahlke | 340/870.37 |
| 4,255,964 A | 3/1981 | Morison | 73/24.01 |
| 4,279,013 A | 7/1981 | Dahlke | 340/870.37 |
| 4,287,553 A | 9/1981 | Braunlich | 361/283 |
| 4,292,769 A | 10/1981 | Maag et al. | 451/9 |
| 4,322,775 A | 3/1982 | Delatorre | 361/283 |
| 4,336,567 A | 6/1982 | Anastasia | 361/283 |
| 4,337,516 A | 6/1982 | Murphy et al. | 364/551 |
| 4,355,536 A | 10/1982 | McShane et al. | 73/633 |
| 4,358,814 A | 11/1982 | Lee et al. | 361/283 |
| 4,370,890 A | 2/1983 | Frick | 73/718 |
| 4,383,443 A | 5/1983 | Langdon | 73/290 |
| 4,389,895 A | 6/1983 | Rud, Jr. | 73/724 |
| 4,390,321 A | 6/1983 | Langlois et al. | 417/15 |
| 4,393,711 A | 7/1983 | Lapides | 73/592 |
| 4,399,824 A | 8/1983 | Davidson | 128/736 |
| 4,417,312 A | 11/1983 | Cronin et al. | 364/510 |
| 4,422,125 A | 12/1983 | Antonazzi et al. | 361/283 |
| 4,422,335 A | 12/1983 | Ohnesorge et al. | 73/724 |
| 4,423,634 A | 1/1984 | Audenard et al. | 73/587 |
| 4,434,451 A | 2/1984 | Delatorre | 361/283 |
| 4,446,741 A | 5/1984 | Sirokorad et al. | 73/654 |
| 4,448,062 A | 5/1984 | Peterson et al. | 73/86 |
| 4,455,874 A | 6/1984 | Paros | 73/704 |
| 4,458,537 A | 7/1984 | Bell et al. | 73/718 |
| 4,459,858 A | 7/1984 | Marsh | 73/861.12 |
| 4,463,612 A | 8/1984 | Thompson | 73/861.22 |
| 4,490,773 A | 12/1984 | Moffatt | 361/283 |
| 4,517,468 A | 5/1985 | Kemper et al. | 290/52 |
| 4,528,869 A | 7/1985 | Kubo et al. | 74/661 |
| 4,530,234 A | 7/1985 | Cullick et al. | 73/53 |
| 4,536,753 A | 8/1985 | Parker | 340/566 |
| 4,540,468 A | 9/1985 | Genco et al. | 162/49 |
| 4,542,436 A | 9/1985 | Carusillo | 361/283 |
| 4,562,744 A | 1/1986 | Bell | 73/718 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,641,529 A | 2/1987 | Lorenzi et al. | 73/601 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,670,733 A | 6/1987 | Bell | 338/36 |
| 4,686,638 A | 8/1987 | Furuse | 364/558 |
| 4,696,191 A | 9/1987 | Claytor et al. | 73/600 |
| 4,705,212 A | 11/1987 | Miller et al. | 236/54 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,785,669 A | 11/1988 | Benson et al. | 73/718 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,833,922 A | 5/1989 | Frick et al. | 73/756 |
| 4,841,286 A | 6/1989 | Kummer | 340/653 |
| 4,853,693 A | 8/1989 | Eaton-Williams | 340/588 |
| 4,860,232 A | 8/1989 | Lee et al. | 364/571.04 |
| 4,866,628 A | 9/1989 | Natarajan | 700/102 |
| 4,873,655 A | 10/1989 | Kondraske | 364/553 |
| 4,875,369 A | 10/1989 | Delatorre | 73/151 |
| 4,878,012 A | 10/1989 | Schulte et al. | 324/60 |
| 4,895,031 A | 1/1990 | Cage | 73/861.355 |
| 4,907,167 A | 3/1990 | Skeirik | 364/500 |
| 4,924,418 A | 5/1990 | Bachman et al. | 364/550 |
| 4,926,364 A | 5/1990 | Brotherton | 364/581 |
| 4,926,674 A | 5/1990 | Fossum et al. | 73/4 |
| 4,934,196 A | 6/1990 | Romano | 73/861.38 |
| 4,939,753 A | 7/1990 | Olson | 375/107 |
| 4,951,174 A | 8/1990 | Grantham et al. | 361/283.1 |
| 4,964,125 A | 10/1990 | Kim | 371/15.1 |
| 4,977,480 A | 12/1990 | Nishihara | 73/724 |
| 4,979,125 A | 12/1990 | Kwun et al. | 702/35 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,014,543 A | 5/1991 | Franklin et al. | 73/40.5 |
| 5,015,949 A | 5/1991 | Koch et al. | 324/207.25 |
| 5,019,760 A | 5/1991 | Chu et al. | 318/490 |
| 5,025,344 A | 6/1991 | Maly et al. | 361/88 |
| 5,043,862 A | 8/1991 | Takahashi et al. | 364/162 |
| 5,047,990 A | 9/1991 | Gafos et al. | 367/6 |
| 5,051,743 A | 9/1991 | Orszulak | 340/780.04 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,094,109 A | 3/1992 | Dean et al. | 73/718 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,168,419 A | 12/1992 | Delatorre | 361/283 |
| 5,175,678 A | 12/1992 | Frerichs et al. | 364/148 |
| 5,189,624 A | 2/1993 | Barlow et al. | 700/169 |
| 5,193,143 A | 3/1993 | Kaemmerer et al. | 395/51 |
| 5,194,819 A | 3/1993 | Briefer | 73/718 |
| 5,195,098 A | 3/1993 | Johnson et al. | 714/753 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,216,612 A | 6/1993 | Cornett et al. | 700/96 |
| 5,224,203 A | 6/1993 | Skeirik | 395/22 |
| 5,228,780 A | 7/1993 | Shepard et al. | 374/175 |
| 5,230,250 A | 7/1993 | Delatorre | 73/733 |
| 5,233,875 A | 8/1993 | Obermeier et al. | 73/718 |
| 5,235,527 A | 8/1993 | Ogawa et al. | 364/571.05 |

(56) References Cited

U.S. PATENT DOCUMENTS

| | | | | |
|---|---|---|---|---|
| 5,265,031 | A | 11/1993 | Malczewski | 364/497 |
| 5,265,222 | A | 11/1993 | Nishiya et al. | 395/3 |
| 5,267,241 | A | 11/1993 | Kowal | 714/706 |
| 5,269,311 | A | 12/1993 | Kirchner et al. | 128/672 |
| 5,274,572 | A | 12/1993 | O'Neill et al. | 364/550 |
| 5,282,131 | A | 1/1994 | Rudd et al. | 364/164 |
| 5,282,261 | A | 1/1994 | Skeirik | 395/22 |
| 5,293,585 | A | 3/1994 | Morita | 395/52 |
| 5,303,181 | A | 4/1994 | Stockton | 365/96 |
| 5,305,230 | A | 4/1994 | Matsumoto et al. | 364/495 |
| 5,311,421 | A | 5/1994 | Nomura et al. | 364/157 |
| 5,317,520 | A | 5/1994 | Castle | 364/482 |
| 5,327,357 | A | 7/1994 | Feinstein et al. | 364/502 |
| 5,329,818 | A | 7/1994 | Frick et al. | 73/708 |
| 5,333,240 | A | 7/1994 | Matsumoto et al. | 706/20 |
| 5,340,271 | A | 8/1994 | Freeman et al. | 415/1 |
| 5,347,843 | A | 9/1994 | Orr et al. | 73/3 |
| 5,349,541 | A | 9/1994 | Alexandro, Jr. et al. | 364/578 |
| 5,351,199 | A | 9/1994 | Ticcioni et al. | 700/282 |
| 5,357,449 | A | 10/1994 | Oh | 364/551.01 |
| 5,361,628 | A | 11/1994 | Marko et al. | 73/116 |
| 5,365,423 | A | 11/1994 | Chand | 364/140 |
| 5,365,787 | A | 11/1994 | Hernandez et al. | 73/660 |
| 5,367,612 | A | 11/1994 | Bozich et al. | 395/22 |
| 5,369,674 | A | 11/1994 | Yokose et al. | 376/245 |
| 5,372,041 | A | 12/1994 | Yoshida et al. | 73/514.31 |
| 5,384,699 | A | 1/1995 | Levy et al. | 364/413.13 |
| 5,386,373 | A | 1/1995 | Keeler et al. | 364/577 |
| 5,388,465 | A | 2/1995 | Okaniwa et al. | 73/861.17 |
| 5,392,293 | A | 2/1995 | Hsue | 324/765 |
| 5,394,341 | A | 2/1995 | Kepner | 364/551.01 |
| 5,394,543 | A | 2/1995 | Hill et al. | 395/575 |
| 5,404,064 | A | 4/1995 | Mermelstein et al. | 310/319 |
| 5,408,406 | A | 4/1995 | Mathur et al. | 364/163 |
| 5,408,586 | A | 4/1995 | Skeirik | 395/23 |
| 5,410,495 | A | 4/1995 | Ramamurthi | 364/511.05 |
| 5,414,645 | A | 5/1995 | Hirano | 364/551.01 |
| 5,419,197 | A | 5/1995 | Ogi et al. | 73/659 |
| 5,430,642 | A | 7/1995 | Nakajima et al. | 364/148 |
| 5,434,774 | A | 7/1995 | Seberger | 364/172 |
| 5,436,705 | A | 7/1995 | Raj | 355/246 |
| 5,440,478 | A | 8/1995 | Fisher et al. | 364/188 |
| 5,442,639 | A | 8/1995 | Crowder et al. | 371/20.1 |
| 5,444,820 | A | 8/1995 | Tzes et al. | 706/21 |
| 5,467,355 | A | 11/1995 | Umeda et al. | 364/571.04 |
| 5,469,070 | A | 11/1995 | Koluvek | 324/713 |
| 5,469,156 | A | 11/1995 | Kogura | 340/870.38 |
| 5,469,735 | A | 11/1995 | Watanabe | 73/118.1 |
| 5,469,749 | A | 11/1995 | Shimada et al. | 73/861.47 |
| 5,471,884 | A | 12/1995 | Czarnocki et al. | 73/720 |
| 5,481,199 | A | 1/1996 | Anderson et al. | 324/705 |
| 5,481,200 | A | 1/1996 | Voegele et al. | 324/718 |
| 5,483,387 | A | 1/1996 | Bauhahn et al. | 359/885 |
| 5,485,753 | A | 1/1996 | Burns et al. | 73/720 |
| 5,486,996 | A | 1/1996 | Samad et al. | 364/152 |
| 5,488,697 | A | 1/1996 | Kaemmerer et al. | 395/51 |
| 5,489,831 | A | 2/1996 | Harris | 318/701 |
| 5,492,016 | A | 2/1996 | Pinto et al. | 73/724 |
| 5,495,769 | A | 3/1996 | Broden et al. | 73/718 |
| 5,497,661 | A | 3/1996 | Stripf et al. | 73/611 |
| 5,510,799 | A | 4/1996 | Maltby et al. | 340/870.3 |
| 5,511,004 | A | 4/1996 | Dubost et al. | 364/551.01 |
| RE35,269 | E | 6/1996 | Comerford | 360/75 |
| 5,526,293 | A | 6/1996 | Mozumder et al. | 364/578 |
| 5,537,335 | A | 7/1996 | Antaki et al. | 702/100 |
| 5,539,638 | A | 7/1996 | Keeler et al. | 364/424.03 |
| 5,542,300 | A | 8/1996 | Lee | 73/724 |
| 5,548,528 | A | 8/1996 | Keeler et al. | 364/497 |
| 5,549,137 | A | 8/1996 | Lenz et al. | 137/486 |
| 5,551,306 | A | 9/1996 | Scarpa | 73/861.16 |
| 5,555,190 | A | 9/1996 | Derby et al. | 364/510 |
| 5,560,246 | A | 10/1996 | Bottinger et al. | 73/861.15 |
| 5,561,599 | A | 10/1996 | Lu | 364/164 |
| 5,570,034 | A | 10/1996 | Needham et al. | 324/763 |
| 5,570,300 | A | 10/1996 | Henry et al. | 364/551.01 |
| 5,572,420 | A | 11/1996 | Lu | 364/153 |
| 5,572,438 | A | 11/1996 | Ehlers et al. | 700/295 |
| 5,573,032 | A | 11/1996 | Lenz et al. | 137/486 |
| 5,578,763 | A | 11/1996 | Spencer et al. | 73/861.08 |
| 5,591,922 | A | 1/1997 | Segeral et al. | 73/861.04 |
| 5,598,521 | A | 1/1997 | Kilgore et al. | 395/326 |
| 5,600,148 | A | 2/1997 | Cole et al. | 250/495.1 |
| 5,600,791 | A | 2/1997 | Carlson et al. | 714/47.3 |
| 5,608,650 | A | 3/1997 | McClendon et al. | 364/510 |
| 5,623,605 | A | 4/1997 | Keshav et al. | 395/200.17 |
| 5,629,870 | A | 5/1997 | Farag et al. | 364/551.01 |
| 5,633,809 | A | 5/1997 | Wissenbach et al. | 364/510 |
| 5,637,802 | A | 6/1997 | Frick et al. | 73/724 |
| 5,640,491 | A | 6/1997 | Bhat et al. | 395/22 |
| 5,642,301 | A | 6/1997 | Warrior et al. | 364/571.02 |
| 5,644,240 | A | 7/1997 | Brugger | 324/439 |
| 5,650,943 | A | 7/1997 | Powell et al. | 702/51 |
| 5,654,869 | A | 8/1997 | Ohi et al. | 361/540 |
| 5,661,668 | A | 8/1997 | Yemini et al. | 364/550 |
| 5,665,899 | A | 9/1997 | Willcox | 73/1.63 |
| 5,668,322 | A | 9/1997 | Broden | 73/756 |
| 5,669,713 | A | 9/1997 | Schwartz et al. | 374/1 |
| 5,671,335 | A | 9/1997 | Davis et al. | 395/23 |
| 5,672,247 | A | 9/1997 | Pangalos et al. | 162/65 |
| 5,675,504 | A | 10/1997 | Serodes et al. | 364/496 |
| 5,675,724 | A | 10/1997 | Beal et al. | 395/182.02 |
| 5,680,109 | A | 10/1997 | Lowe et al. | 340/608 |
| 5,682,317 | A | 10/1997 | Keeler et al. | 364/431.03 |
| 5,682,476 | A | 10/1997 | Tapperson et al. | 370/225 |
| 5,700,090 | A | 12/1997 | Eryurek | 374/210 |
| 5,703,575 | A | 12/1997 | Kirkpatrick | 340/870.17 |
| 5,704,011 | A | 12/1997 | Hansen et al. | 395/22 |
| 5,705,754 | A | 1/1998 | Keita et al. | 73/861.357 |
| 5,705,978 | A | 1/1998 | Frick et al. | 340/511 |
| 5,708,211 | A | 1/1998 | Jepson et al. | 73/861.04 |
| 5,708,585 | A | 1/1998 | Kushion | 364/431.061 |
| 5,710,370 | A | 1/1998 | Shanahan et al. | 73/1.35 |
| 5,710,708 | A | 1/1998 | Wiegland | 364/470.1 |
| 5,713,668 | A | 2/1998 | Lunghofer et al. | 374/179 |
| 5,719,378 | A | 2/1998 | Jackson, Jr. et al. | 219/497 |
| 5,731,522 | A * | 3/1998 | Sittler | 73/708 |
| 5,734,975 | A | 3/1998 | Zele et al. | 455/307 |
| 5,736,649 | A | 4/1998 | Kawasaki et al. | 73/861.23 |
| 5,741,074 | A | 4/1998 | Wang et al. | 374/185 |
| 5,742,845 | A | 4/1998 | Wagner | 395/831 |
| 5,746,511 | A | 5/1998 | Eryurek et al. | 374/2 |
| 5,747,701 | A | 5/1998 | Marsh et al. | 73/861.23 |
| 5,748,883 | A | 5/1998 | Carlson et al. | 714/47.3 |
| 5,752,008 | A | 5/1998 | Bowling | 395/500 |
| 5,754,451 | A | 5/1998 | Williams | 702/185 |
| 5,756,898 | A | 5/1998 | Diatschenko et al. | 73/592 |
| 5,757,608 | A | 5/1998 | Bernot et al. | 361/283.4 |
| 5,764,539 | A | 6/1998 | Rani | 364/557 |
| 5,764,891 | A | 6/1998 | Warrior | 710/72 |
| 5,781,024 | A | 7/1998 | Blomberg et al. | 324/763 |
| 5,781,878 | A | 7/1998 | Mizoguchi et al. | 701/109 |
| 5,790,413 | A | 8/1998 | Bartusiak et al. | 364/485 |
| 5,796,006 | A | 8/1998 | Bellet et al. | 73/661 |
| 5,801,689 | A | 9/1998 | Huntsman | 345/329 |
| 5,805,442 | A | 9/1998 | Crater et al. | 364/138 |
| 5,817,950 | A | 10/1998 | Wiklund et al. | 73/861.66 |
| 5,825,664 | A | 10/1998 | Warrior et al. | 700/7 |
| 5,828,567 | A | 10/1998 | Eryurek et al. | 700/79 |
| 5,829,876 | A | 11/1998 | Schwartz et al. | 374/1 |
| 5,848,383 | A | 12/1998 | Yuuns | 702/102 |
| 5,854,993 | A | 12/1998 | Crichnik | 702/54 |
| 5,854,994 | A * | 12/1998 | Canada et al. | 702/56 |
| 5,859,964 | A | 1/1999 | Wang et al. | 395/185.01 |
| 5,869,772 | A | 2/1999 | Storer | 73/861.24 |
| 5,874,676 | A | 2/1999 | Maki, Jr. | 73/579 |
| 5,876,122 | A | 3/1999 | Eryurek | 374/183 |
| 5,880,376 | A | 3/1999 | Sai et al. | 73/861.08 |
| 5,887,978 | A | 3/1999 | Lunghofer et al. | 374/179 |
| 5,900,801 | A | 5/1999 | Heagle et al. | |
| 5,908,990 | A | 6/1999 | Cummings | 73/861.22 |
| 5,911,162 | A | 6/1999 | Denner | 73/718 |
| 5,912,499 | A | 6/1999 | Diem et al. | 257/419 |
| 5,920,016 | A | 7/1999 | Broden | 73/756 |
| 5,923,557 | A | 7/1999 | Eidson | 364/471.03 |

(56) References Cited

U.S. PATENT DOCUMENTS

| | | | |
|---|---|---|---|
| 5,924,086 A | 7/1999 | Mathur et al. | 706/25 |
| 5,926,778 A | 7/1999 | Pöppel | 702/130 |
| 5,934,371 A | 8/1999 | Bussear et al. | 166/53 |
| 5,936,514 A | 8/1999 | Anderson et al. | 340/310.01 |
| 5,940,013 A | 8/1999 | Vladimir et al. | 340/945 |
| 5,940,290 A | 8/1999 | Dixon | 364/138 |
| 5,956,663 A | 9/1999 | Eryurek et al. | 702/183 |
| 5,965,819 A | 10/1999 | Piety et al. | 73/660 |
| 5,970,430 A | 10/1999 | Burns et al. | 702/122 |
| 5,992,240 A | 11/1999 | Tsuruoka et al. | 73/718 |
| 5,995,910 A * | 11/1999 | Discenzo | 702/56 |
| 6,002,952 A | 12/1999 | Diab et al. | 600/310 |
| 6,006,338 A | 12/1999 | Longsdorf et al. | 713/340 |
| 6,014,612 A | 1/2000 | Larson et al. | 702/183 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |
| 6,017,143 A | 1/2000 | Eryurek et al. | 700/51 |
| 6,023,399 A | 2/2000 | Kogure | 361/23 |
| 6,026,352 A | 2/2000 | Burns et al. | 702/182 |
| 6,038,579 A | 3/2000 | Sekine | 708/400 |
| 6,041,287 A | 3/2000 | Dister et al. | 702/182 |
| 6,045,260 A | 4/2000 | Schwartz et al. | 374/183 |
| 6,046,642 A | 4/2000 | Brayton et al. | 330/296 |
| 6,047,220 A | 4/2000 | Eryurek et al. | 700/28 |
| 6,047,222 A | 4/2000 | Burns et al. | 700/79 |
| 6,052,655 A | 4/2000 | Kobayashi et al. | 702/184 |
| 6,059,254 A | 5/2000 | Sundet et al. | 248/678 |
| 6,061,603 A | 5/2000 | Papadopoulos et al. | 700/83 |
| 6,069,560 A | 5/2000 | Larsson | 340/540 |
| 6,072,150 A | 6/2000 | Sheffer | 219/121.83 |
| 6,094,600 A | 7/2000 | Sharpe, Jr. et al. | 700/19 |
| 6,104,875 A | 8/2000 | Gallagher et al. | 717/168 |
| 6,112,131 A | 8/2000 | Ghorashi et al. | 700/142 |
| 6,119,047 A | 9/2000 | Eryurek et al. | 700/28 |
| 6,119,529 A | 9/2000 | Di Marco et al. | 73/861.68 |
| 6,139,180 A | 10/2000 | Usher et al. | 374/1 |
| 6,151,560 A | 11/2000 | Jones | 702/58 |
| 6,179,964 B1 | 1/2001 | Begemann et al. | 162/198 |
| 6,182,501 B1 | 2/2001 | Furuse et al. | 73/49.2 |
| 6,192,281 B1 | 2/2001 | Brown et al. | 700/2 |
| 6,195,591 B1 | 2/2001 | Nixon et al. | 700/2 |
| 6,199,018 B1 | 3/2001 | Quist et al. | 702/34 |
| 6,209,048 B1 | 3/2001 | Wolff | 710/62 |
| 6,236,096 B1 | 5/2001 | Chang et al. | 257/419 |
| 6,236,948 B1 | 5/2001 | Eck et al. | 702/45 |
| 6,237,424 B1 | 5/2001 | Salmasi et al. | 73/861.17 |
| 6,260,004 B1 * | 7/2001 | Hays et al. | 702/183 |
| 6,263,487 B1 | 7/2001 | Stripf et al. | 717/1 |
| 6,272,438 B1 | 8/2001 | Cunningham et al. | 702/56 |
| 6,289,735 B1 | 9/2001 | Dister et al. | 73/579 |
| 6,295,875 B1 | 10/2001 | Frick et al. | 73/718 |
| 6,298,377 B1 | 10/2001 | Hartikainen et al. | 709/223 |
| 6,298,454 B1 | 10/2001 | Schleiss et al. | 714/4 |
| 6,304,828 B1 | 10/2001 | Swanick et al. | 702/107 |
| 6,307,483 B1 | 10/2001 | Westfield et al. | 340/870.11 |
| 6,311,136 B1 | 10/2001 | Henry et al. | 702/45 |
| 6,317,701 B1 | 11/2001 | Pyostsia et al. | 702/188 |
| 6,327,914 B1 | 12/2001 | Dutton | 73/861.356 |
| 6,330,005 B1 | 12/2001 | Tonelli et al. | 715/735 |
| 6,330,525 B1 * | 12/2001 | Hays et al. | 702/183 |
| 6,347,252 B1 | 2/2002 | Behr et al. | 700/2 |
| 6,356,191 B1 | 3/2002 | Kirkpatrick et al. | 340/501 |
| 6,360,277 B1 | 3/2002 | Ruckley et al. | 9/250 |
| 6,367,328 B1 | 4/2002 | Gorman et al. | 73/592 |
| 6,370,448 B1 | 4/2002 | Eryurek et al. | 700/282 |
| 6,370,879 B1 | 4/2002 | Stalder et al. | 60/725 |
| 6,377,859 B1 | 4/2002 | Brown et al. | 700/79 |
| 6,378,364 B1 | 4/2002 | Pelletier et al. | 73/152.47 |
| 6,396,426 B1 | 5/2002 | Balard et al. | 341/120 |
| 6,397,114 B1 | 5/2002 | Eryurek et al. | 700/51 |
| 6,405,099 B1 | 6/2002 | Nagai et al. | 700/159 |
| 6,425,038 B1 | 7/2002 | Sprecher | 710/269 |
| 6,434,504 B1 | 8/2002 | Eryurek et al. | 702/130 |
| 6,447,459 B1 | 9/2002 | Larom | 600/538 |
| 6,449,574 B1 | 9/2002 | Eryurek et al. | 702/643 |
| 6,473,656 B1 | 10/2002 | Langels et al. | 700/17 |
| 6,473,710 B1 | 10/2002 | Eryurek | 702/133 |
| 6,480,793 B1 | 11/2002 | Martin | 702/45 |
| 6,492,921 B1 | 12/2002 | Kunitani et al. | 341/118 |
| 6,493,689 B2 | 12/2002 | Kotoulas et al. | 706/23 |
| 6,496,814 B1 | 12/2002 | Busche | 706/21 |
| 6,497,222 B2 | 12/2002 | Bolz et al. | 123/476 |
| 6,505,517 B1 | 1/2003 | Eryurek et al. | 73/861.08 |
| 6,519,546 B1 | 2/2003 | Eryurek et al. | 702/130 |
| 6,530,259 B1 | 3/2003 | Kelly et al. | 73/23.2 |
| 6,532,392 B1 | 3/2003 | Eryurek et al. | 700/54 |
| 6,539,267 B1 | 3/2003 | Eryurek et al. | 700/51 |
| 6,546,814 B1 | 4/2003 | Choe et al. | 73/862.08 |
| 6,556,145 B1 | 4/2003 | Kirkpatrick et al. | 340/870.17 |
| 6,561,038 B2 | 5/2003 | Gravel et al. | 73/729.2 |
| 6,564,268 B1 | 5/2003 | Davis et al. | 710/11 |
| 6,567,006 B1 | 5/2003 | Lander et al. | 340/605 |
| 6,584,847 B1 | 7/2003 | Hirose | 73/579 |
| 6,594,603 B1 | 7/2003 | Eryurek et al. | 702/104 |
| 6,597,997 B2 | 7/2003 | Tingley | 702/34 |
| 6,601,005 B1 * | 7/2003 | Eryurek et al. | 702/104 |
| 6,611,775 B1 | 8/2003 | Coursolle et al. | 702/65 |
| 6,615,149 B1 | 9/2003 | Wehrs | 702/76 |
| 6,633,782 B1 | 10/2003 | Schleiss et al. | 700/26 |
| 6,637,267 B2 | 10/2003 | Fiebelkorn et al. | 73/587 |
| 6,654,697 B1 | 11/2003 | Eryurek et al. | 702/47 |
| 6,662,120 B2 | 12/2003 | Drahm et al. | 73/861.355 |
| 6,701,274 B1 | 3/2004 | Eryurek et al. | 702/140 |
| 6,722,185 B2 | 4/2004 | Lawson et al. | 73/40 |
| 6,727,812 B2 | 4/2004 | Sauler et al. | 340/511 |
| 6,735,549 B2 | 5/2004 | Ridolfo | 702/181 |
| 6,738,388 B1 | 5/2004 | Stevenson et al. | 370/465 |
| 6,751,560 B1 | 6/2004 | Tingley et al. | 702/51 |
| 6,754,601 B1 | 6/2004 | Eryurek et al. | 702/104 |
| 6,758,168 B2 | 7/2004 | Koskinen et al. | 122/7 |
| 6,785,592 B1 | 8/2004 | Smith et al. | 700/291 |
| 6,854,028 B2 | 2/2005 | Smith | 710/100 |
| 6,859,755 B2 | 2/2005 | Eryurek et al. | 702/183 |
| 6,880,403 B1 | 4/2005 | Shimada et al. | 73/652 |
| 6,892,317 B1 | 5/2005 | Sampath et al. | 714/4.3 |
| 6,904,476 B2 * | 6/2005 | Hedtke | 710/72 |
| 6,907,383 B2 | 6/2005 | Eryurek et al. | 702/183 |
| 6,915,364 B1 | 7/2005 | Christensen et al. | 710/104 |
| 6,920,789 B2 | 7/2005 | Sakai | 73/587 |
| 6,951,133 B2 | 10/2005 | Passarelli | 73/643 |
| 6,970,003 B2 | 11/2005 | Rome et al. | 324/718 |
| 6,976,503 B2 | 12/2005 | Ens et al. | 137/552 |
| 6,993,445 B2 | 1/2006 | Clarke et al. | 702/106 |
| 7,010,459 B2 | 3/2006 | Eryurek et al. | 702/182 |
| 7,013,185 B2 | 3/2006 | Simon | 700/19 |
| 7,018,800 B2 | 3/2006 | Huisenga et al. | 435/6 |
| 7,023,205 B1 | 4/2006 | Krupp | 324/239 |
| 7,035,773 B2 | 4/2006 | Keyes et al. | 702/188 |
| 7,036,381 B2 | 5/2006 | Broden et al. | 73/708 |
| 7,040,179 B2 | 5/2006 | Drahm et al. | 73/861.356 |
| 7,058,542 B2 | 6/2006 | Hauhia et al. | 702/183 |
| 7,085,610 B2 | 8/2006 | Eryurek et al. | 700/29 |
| 7,099,852 B2 * | 8/2006 | Unsworth et al. | 706/23 |
| 7,109,883 B2 | 9/2006 | Trimble et al. | 340/870.16 |
| 7,114,516 B2 | 10/2006 | Ito | 137/487.5 |
| 7,137,307 B2 | 11/2006 | Huybrechts et al. | 73/861.12 |
| 7,143,007 B2 | 11/2006 | Long et al. | 702/184 |
| 7,171,281 B2 | 1/2007 | Weber et al. | 700/96 |
| 7,206,646 B2 | 4/2007 | Nixon et al. | 700/83 |
| 7,254,518 B2 | 8/2007 | Eryurek et al. | 702/183 |
| 7,258,021 B2 | 8/2007 | Broden | 73/756 |
| 7,258,024 B2 | 8/2007 | Dimarco et al. | 73/861.22 |
| 7,262,693 B2 | 8/2007 | Karschnia et al. | 340/508 |
| 7,290,450 B2 | 11/2007 | Brown et al. | 73/579 |
| 7,321,846 B1 | 1/2008 | Huiseng et al. | 702/183 |
| 7,406,387 B2 | 7/2008 | Hashizume et al. | 702/47 |
| 7,435,581 B2 | 10/2008 | West | 435/289.1 |
| 7,502,744 B2 | 3/2009 | Garrow et al. | 705/1.1 |
| 7,523,667 B2 | 4/2009 | Brown et al. | 73/592 |
| 7,528,737 B2 | 5/2009 | Hedtke et al. | |
| 7,577,543 B2 | 8/2009 | Brahmajosyula et al. | 702/138 |
| 7,627,441 B2 | 12/2009 | Longsdorf et al. | 702/56 |
| 7,680,549 B2 | 3/2010 | Kavaklioglu et al. | 700/26 |

(56) References Cited

U.S. PATENT DOCUMENTS

| | | | |
|---|---|---|---|
| 7,702,478 B2 | 4/2010 | Hedtke et al. | 702/100 |
| 7,821,437 B1 | 10/2010 | Rud et al. | 341/123 |
| 7,827,988 B2 | 11/2010 | Matthews et al. | 128/204.21 |
| 7,913,566 B2 | 3/2011 | Hedtke | 73/649 |
| 7,940,189 B2 | 5/2011 | Brown | 340/621 |
| 8,311,778 B2 | 11/2012 | Bronczyk et al. | 702/188 |
| 2002/0013629 A1 | 1/2002 | Nixon et al. | 700/4 |
| 2002/0029808 A1 | 3/2002 | Friend et al. | 137/551 |
| 2002/0032544 A1 | 3/2002 | Reid et al. | 702/183 |
| 2002/0055790 A1 | 5/2002 | Havekost | 700/80 |
| 2002/0077711 A1 | 6/2002 | Nixon et al. | 700/51 |
| 2002/0077782 A1 | 6/2002 | Fruehling et al. | 702/185 |
| 2002/0078752 A1 | 6/2002 | Braunling et al. | 73/627 |
| 2002/0121910 A1 | 9/2002 | Rome et al. | 324/718 |
| 2002/0130846 A1 | 9/2002 | Nixon et al. | 345/169 |
| 2002/0145515 A1 | 10/2002 | Snowbarger et al. | 340/514 |
| 2002/0145568 A1 | 10/2002 | Winter | 343/701 |
| 2002/0148644 A1 | 10/2002 | Schultz et al. | 175/39 |
| 2002/0163427 A1 | 11/2002 | Eryurek et al. | 340/500 |
| 2002/0194547 A1 | 12/2002 | Christenson et al. | 714/43 |
| 2003/0014536 A1 | 1/2003 | Christensen et al. | 709/238 |
| 2003/0033040 A1 | 2/2003 | Billings | 700/97 |
| 2003/0045962 A1 | 3/2003 | Eryurek et al. | 700/128 |
| 2003/0083953 A1 | 5/2003 | Starkey | 705/26 |
| 2003/0158803 A1 | 8/2003 | Darken et al. | 705/36 |
| 2004/0024568 A1 | 2/2004 | Eryurek et al. | 702/182 |
| 2004/0025593 A1 | 2/2004 | Hashimoto et al. | 73/643 |
| 2004/0064203 A1 | 4/2004 | Bornside et al. | 700/78 |
| 2004/0093174 A1 | 5/2004 | Lander | 702/56 |
| 2004/0128034 A1 | 7/2004 | Lenker et al. | 700/282 |
| 2004/0167423 A1 | 8/2004 | Pagnano et al. | 702/189 |
| 2004/0186927 A1 | 9/2004 | Eryurek et al. | 710/12 |
| 2004/0199361 A1 | 10/2004 | Lu et al. | 702/183 |
| 2004/0249583 A1 | 12/2004 | Eryurek et al. | 702/47 |
| 2005/0011278 A1 | 1/2005 | Brown et al. | 73/861.18 |
| 2005/0055291 A1 | 3/2005 | Andren et al. | 700/291 |
| 2005/0072239 A1* | 4/2005 | Longsdorf et al. | 73/649 |
| 2005/0132808 A1* | 6/2005 | Brown et al. | 73/592 |
| 2005/0149570 A1 | 7/2005 | Sasaki et al. | 707/104.1 |
| 2005/0168343 A1 | 8/2005 | Longsdorf et al. | 340/664 |
| 2005/0284237 A1 | 12/2005 | Henry et al. | 73/861.356 |
| 2006/0075009 A1 | 4/2006 | Lenz et al. | 708/160 |
| 2006/0087402 A1 | 4/2006 | Manning et al. | 340/3.1 |
| 2006/0127183 A1 | 6/2006 | Bishop | 405/37 |
| 2006/0212139 A1 | 9/2006 | Hedtke et al. | 700/28 |
| 2006/0229931 A1 | 10/2006 | Fligler et al. | 705/10 |
| 2006/0277000 A1 | 12/2006 | Wehrs | 702/183 |
| 2007/0010967 A1 | 1/2007 | Scherr | 702/182 |
| 2007/0010968 A1 | 1/2007 | Longsdorf et al. | 702/183 |
| 2007/0168057 A1 | 7/2007 | Blevins et al. | 700/53 |
| 2007/0266020 A1 | 11/2007 | Case et al. | 707/5 |
| 2008/0033693 A1 | 2/2008 | Andenna et al. | 702/179 |
| 2008/0082294 A1 | 4/2008 | Pihlaja et al. | 702/179 |
| 2008/0103629 A1 | 5/2008 | Milanovic et al. | 700/282 |
| 2008/0110459 A1 | 5/2008 | Farbarik | 128/204.18 |
| 2008/0208538 A1 | 8/2008 | Visser et al. | 702/190 |
| 2009/0121790 A1 | 5/2009 | Brown et al. | 330/279 |
| 2009/0309574 A1 | 12/2009 | Goupil | |
| 2010/0011869 A1 | 1/2010 | Klosinski | 73/700 |
| 2010/0138066 A1 | 6/2010 | Kong | 700/295 |
| 2010/0211443 A1 | 8/2010 | Carrel et al. | 705/14.11 |
| 2012/0041704 A1 | 2/2012 | Rovner et al. | |
| 2012/0051399 A1 | 3/2012 | Rud et al. | 374/185 |

FOREIGN PATENT DOCUMENTS

| | | |
|---|---|---|
| CN | 1 257 179 | 6/2000 |
| CN | 1346435 | 4/2002 |
| DE | 32 13 866 A1 | 10/1983 |
| DE | 3340834 A1 | 5/1985 |
| DE | 35 03 597 | 7/1986 |
| DE | 35 03 597 C1 | 7/1986 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |
| DE | 19905071 A1 | 8/2000 |
| DE | 299 17 651 U1 | 12/2000 |
| DE | 199 47 129 | 4/2001 |
| DE | 100 36 971 A1 | 2/2002 |
| DE | 102 23 725 A1 | 4/2003 |
| EP | 0 122 622 A1 | 10/1984 |
| EP | 0 413 814 A1 | 2/1991 |
| EP | 0 511 553 | 4/1992 |
| EP | 0 487 419 A2 | 5/1992 |
| EP | 0 512 794 A2 | 11/1992 |
| EP | 0 524 550 A1 | 1/1993 |
| EP | 0 594 227 A1 | 4/1994 |
| EP | 0 624 847 A1 | 11/1994 |
| EP | 0 644 470 A2 | 3/1995 |
| EP | 0 697 586 | 2/1996 |
| EP | 0 697 586 A2 | 2/1996 |
| EP | 0 749 057 A1 | 12/1996 |
| EP | 0 825 506 A2 | 7/1997 |
| EP | 0 827 096 A2 | 9/1997 |
| EP | 0 838 768 A2 | 9/1997 |
| EP | 1 022 626 A2 | 10/1997 |
| EP | 0 807 804 A2 | 11/1997 |
| EP | 0 827 096 | 3/1998 |
| EP | 1 058 093 A1 | 5/1999 |
| EP | 0 335 957 B1 | 11/1999 |
| EP | 0 965 897 A | 12/1999 |
| EP | 1 022 626 A2 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 317 969 | 4/1998 |
| GB | 2 342 453 A | 4/2000 |
| GB | 2 347 232 A | 8/2000 |
| JP | 56-031573 | 3/1981 |
| JP | 57196619 | 2/1982 |
| JP | 58-129316 | 8/1983 |
| JP | 59-116811 | 7/1984 |
| JP | 59-163520 | 9/1984 |
| JP | 59-176643 | 10/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |
| JP | 62-30915 | 2/1987 |
| JP | 62-080535 | 4/1987 |
| JP | 62-50901 | 9/1987 |
| JP | 63-169532 | 7/1988 |
| JP | 64-01914 | 1/1989 |
| JP | 64-72699 | 3/1989 |
| JP | 11-87430 | 7/1989 |
| JP | 2-05105 | 1/1990 |
| JP | 3-118424 | 5/1991 |
| JP | 3-229124 | 10/1991 |
| JP | 4-70906 | 3/1992 |
| JP | 05-60596 A | 3/1993 |
| JP | 5-122768 | 5/1993 |
| JP | 5-164781 | 6/1993 |
| JP | 6-95882 | 4/1994 |
| JP | 06242192 | 9/1994 |
| JP | 06-248224 | 10/1994 |
| JP | 7-063586 | 3/1995 |
| JP | 07234988 | 9/1995 |
| JP | 8-054923 | 2/1996 |
| JP | 8-102241 | 4/1996 |
| JP | 08-114638 | 5/1996 |
| JP | 8-136386 | 5/1996 |
| JP | 8-166309 | 6/1996 |

(56) References Cited

FOREIGN PATENT DOCUMENTS

| | | |
|---|---|---|
| JP | 8-247076 | 9/1996 |
| JP | 8-313466 | 11/1996 |
| JP | 9054611 | 2/1997 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| JP | 11-505922 | 5/1999 |
| JP | 3139597 | 12/2000 |
| JP | 2002-538420 U | 11/2002 |
| JP | 2003-503784 | 1/2003 |
| JP | 2004021712 | 1/2004 |
| JP | 2004034112 | 2/2004 |
| JP | 2004-186445 | 7/2004 |
| JP | 2005-048638 | 2/2005 |
| JP | 09-005092 A | 2/2007 |
| JP | 2007-040763 A | 2/2007 |
| JP | 2007-507712 | 3/2007 |
| JP | 2008-513879 | 5/2008 |
| RU | 2080647 | 5/1997 |
| RU | 2121105 | 10/1998 |
| RU | 2190267 C2 | 9/2002 |
| SU | 901676 | 1/1982 |
| WO | WO 94/25933 | 11/1994 |
| WO | WO 95/23361 | 8/1995 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/19782 | 4/1999 |
| WO | WO 99/53286 | 10/1999 |
| WO | WO 00/41050 | 7/2000 |
| WO | WO 00/50851 | 8/2000 |
| WO | WO 00/55700 | 9/2000 |
| WO | WO 00/70531 | 11/2000 |
| WO | WO 01/01213 A1 | 1/2001 |
| WO | WO 01/19440 | 3/2001 |
| WO | WO 01/77766 | 10/2001 |
| WO | WO 01/90704 A2 | 11/2001 |
| WO | WO 02/27418 | 4/2002 |
| WO | WO 03/081002 | 10/2003 |
| WO | WO 2004/044666 A | 5/2004 |
| WO | WO 2004/048898 A | 6/2004 |
| WO | 2005/010522 | 2/2005 |
| WO | 2005/033639 | 4/2005 |
| WO | WO 2007/100280 A1 | 9/2007 |
| WO | WO 2008/039993 | 4/2008 |

OTHER PUBLICATIONS

Pittard et al., Experimental and Numerical Investigation of Turbulent Flow Induced Pipe Vibration in Fully Developed Flow, Jul. 2004, Review of Scientific Instruments, vol. 75, No. 7, pp. 2393-2401.*

Damiano et al., Current Applications of Vibration Monitoring and Neutron Noise Analysis, Feb. 1990, Oak Ridge National Laboratory, Prepared for U.S. Nuclear Regulatory Commission, 39 pp.*

Reimche et al., Basics of Vibration Monitoring for Fault Detection and Process Control, Jun. 2-6, 2003, PANNDT 2003, Rio de Janeiro, Brasil, 10 pp.*

Hodkiewicz et al., The Effect of Change in Flow Rate on the Vibration of Double-Suction Centrifugal Pumps, 2002, Proceedings of the Institution of Mechanical Engineers, Part E: Journal of Process Mechanical Engineering, vol. 216, Part E, pp. 47-58.*

"A TCP\IP Tutorial" by, Socolofsky et al., Spider Systems Limited, Jan. 1991 pp. 1-23.

"Approval Standards for Explosionproof Electrical Equipment General Requirements", Factory Mutual Research, Cl. No. 3615, Mar. 1989, pp. 1-34.

"Approval Standard Intrinsically Safe Apparatus and Associated Apparatus for Use in Class I, II, and III, Division 1 Hazardous (Classified) Locations", Factory Mutual Research, Cl. No. 3610, Oct. 1988, pp. 1-70.

"Automation On-line" by, Phillips et al., Plant Services, Jul. 1997, pp. 41-45.

"Climb to New Heights by Controlling your PLCs Over the Internet" by, Phillips et al., Intech, Aug. 1998, pp. 50-51.

"Ethernet emerges as viable, inexpensive fieldbus", Paul G. Schreier, Personal Engineering, Dec. 1997, p. 23-29.

"Ethernet Rules Closed-loop System" by, Eidson et al., Intech, Jun. 1998, pp. 39-42.

"Fieldbus Standard for Use in Industrial Control Systems Part 2: Physical Layer Specification and Service Definition", ISA-S50.02-1992, pp. 1-93.

"Fieldbus Standard for Use in Industrial Control Systems Part 3: Data Link Service Definition", ISA-S50.02-1997, Part 3, Aug. 1997, pp. 1-159.

Fieldbus Standard for Use in Industrial Control Systems Part 4: Data Link Protocol Specification, ISA-S50.02-1997, Part 4, Aug. 1997, pp. 1-148.

"Fieldbus Support for Process Analysis" by, Blevins et al., Fisher-Rosemount Systems, Inc., 1995, pp. 121-128.

"Fieldbus Technical Overview Understanding FOUNDATION™ fieldbus technology", Fisher-Rosemount, 1998, pp. 1-23.

"Hypertext Transfer Protocol—Http/1.0" by, Berners-Lee et al., MIT/LCS, May 1996, pp. 1-54.

"Infranets, Intranets, and the Internet" by, Pradip Madan, Echelon Corp, Sensors, Mar. 1997, pp. 46-50.

"Internet Protocol Darpa Internet Program Protocol Specification" by, Information Sciences Institute, University of Southern California, RFC 791, Sep. 1981, pp. 1-43.

"Introduction to Emit", emWare, Inc., 1997, pp. 1-22.

"Introduction to the Internet Protocols" by, Charles L. Hedrick, Computer Science Facilities Group, Rutgers University, Oct. 3, 1988, pp. 1-97.

"Is There a Future for Ethernet in Industrial Control?", Miclot et al., Plant Engineering, Oct. 1988, pp. 44-46, 48, 50.

LFM/SIMA Internet Remote Diagnostics Research Project Summary Report, Stanford University, Jan. 23, 1997, pp. 1-6.

"Managing Devices with the Web" by, Howard et al., Byte, Sep. 1997, pp. 45-64.

"PC Software Gets Its Edge From Windows, Components, and the Internet", Wayne Labs, I&Cs, Mar. 1997, pp. 23-32.

Proceedings Sensor Expo, Aneheim, California, Produced by Expocon Managemnet Associates, Inc., Apr. 1996, pp. 9-21.

Proceedings Sensor Expo, Boston, Massachuttes, Produced by Expocon Management Associates, Inc., May 1997, pp. 1-416.

"Smart Sensor Network of the Future" by, Jay Warrior, Sensors, Mar. 1997, pp. 40-45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1-69.

"On-Line Statistical Process Control for a Glass Tank Ingredient Scale," by R.A. Weisman, *IFAC real Time Programming*, 1985, pp. 29-38.

"The Performance of Control Charts for Monitoring Process Variation," by C. Lowry et al., *Commun. Statis.-Simula.*, 1995, pp. 409-437.

"A Knowledge-Based Approach for Detection and Diagnosis of Out-of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

"Programmable Hardware Architectures for Sensor Validation", by M.P. Henry et al., *Control Eng. Practice*, vol. 4, No. 10., pp. 1339-1354, (1996).

(56) References Cited

OTHER PUBLICATIONS

"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.
"Smart Temperature Measurement in the '90s", by T. Kerlin et al., *C&I*, (1990).
"Software-Based Fault-Tolerant Control Design for Improved Power Plant Operation," *IEEE/IFAC Joint Symposium on Computer-Aided Control System Design*, Mar. 7-9, 1994, pp. 585-590.
A Standard Interface for Self-Validating Sensors, by M.P. Henry et al., Report No. QUEL 1884/91, (1991).
"Taking Full Advantage of Smart Transmitter Technology Now," by G. Orrison, *Control Engineering*, vol. 42, No. 1, Jan. 1995.
"Application of Neural Networks for Sensor Validation and Plant Monitoring," by B. Upadhyaya et al., *Nuclear Engineering*, vol. 97, No. 2, Feb. 1992 pp. 170-176.
"Automated Generation of Nonlinear System Characterization for Sensor Failure Detection," by B.R. Upadhyaya et al., *ISA*, 1989 pp. 269-274.
"In Situ Calibration of Nuclear Plant Platinum Resistance Thermometers Using Johnson Noise Methods," *EPRI*, Jun. 1983.
"Johnson Noise Thermometer for High Radiation and High-Temperature Environments," by L. Oakes et al., *Fifth Symposium on Space Nuclear Power Systems*, Jan. 1988, pp. 2-23.
"Development of a Resistance Thermometer For Use Up to 1600° C.", by M.J. de Groot et al., *CAL LAB*, Jul./Aug. 1996, pp. 38-41.
"Survey, Applications, and Prospects of Johnson Noise Thermometry," by T. Blalock et al., *Electrical Engineering Department*, 1981 pp. 2-11.
"Noise Thermometry for Industrial and Metrological Applications at KFA Julich," by H. Brixy et al., *7th International Symposium on Temperature*, 1992.
"Johnson Noise Power Thermometer and its Application in Process Temperature Measurement," by T.V. Blalock et al., *American Institute of Physics* 1982, pp. 1249-1259.
"Field-based Architecture is Based on Open Systems, Improves Plant Performance", by P. Cleaveland, *I&CS*, Aug. 1996, pp. 73-74.
"Tuned-Circuit Dual-Mode Johnson Noise Thermometers," by R.L. Shepard et al., Apr. 1992.
"Tuned-Circuit Johnson Noise Thermometry," by Michael Roberts et al., *7th Symposium on Space Nuclear Power Systems*, Jan. 1990.
"Smart Field Devices Provide New Process Data, Increase System Flexibility," by Mark Boland, *I&CS*, Nov. 1994, pp. 45-51.
"Wavelet Analysis of Vibration, Part I: Theory," by D.E. Newland, *Journal of Vibration and Acoustics*, vol. 116, Oct. 1994, pp. 409-416.
"Wavelet Analysis of Vibration, Part 2: Wavelet Maps," by D.E. Newland, *Journal of Vibration and Acoustics*, vol. 116, Oct. 1994, pp. 417-425.
"Development of a Long-Life, High-Reliability Remotely Operated Johnson Noise Thermometer," by R.L. Shepard et al., *ISA*, 1991, pp. 77-84.
"Application of Johnson Noise Thermometry to Space Nuclear Reactors," by M.J. Roberts et al., *Presented at the 6th Symposium on Space Nuclear Power Systems*, Jan. 9-12, 1989.
"A Decade of Progress in High Temperature Johnson Noise Thermometry," by T.V. Blalock et al., *American Institute of Physics*, 1982 pp. 1219-1223.
"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.
"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.
"Detecting Blockage in Process Connections of Differential Pressure Transmitters", by E. Taya et al., *SICE*, 1995, pp. 1605-1608.
"Development and Application of Neural Network Algorithms for Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).
"Fuzzy Logic and Neural Network Applications to Fault Diagnosis", by P. Frank et al., *International Journal of Approximate Reasoning*, (1997), pp. 68-88.
"Keynote Paper: Hardware Compilation—A New Technique for Rapid Prototyping of Digital Systems—Applied to Sensor Validation", by M.P. Henry, *Control Eng. Practice*, vol. 3, No. 7., pp. 907-924, (1995).
"The Implications of Digital Communications on Sensor Validation", by M. Henry et al., Report No. QUEL 1912/92, (1992).
"In-Situ Response Time Testing of Thermocouples", *ISA*, by H.M. Hashemian et al., Paper No. 89-0056, pp. 587-593, (1989).
"An Integrated Architecture for Signal Validation in Power Plants," by B.R. Upadhyaya et al., *Third IEEE International Symposium on Intelligent Control*, Aug. 24-26, 1988, pp. 1-6.
"Integration of Multiple Signal Validation Modules for Sensor Monitoring," by B. Upadhyaya et al., *Department of Nuclear Engineering*, Jul. 8, 1990, pp. 1-6.
"Intelligent Behaviour for Self-Validating Sensors", by M.P. Henry, *Advances in Measurement*, pp. 1-7, (May 1990).
"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.
"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.
"Neural Networks for Sensor Validation and Plant Monitoring," by B. Upadhyaya, *International Fast Reactor Safety Meeting*, Aug. 12-16, 1990, pp. 2-10.
"Neural Networks for Sensor Validation and Plantwide Monitoring," by E. Eryurek, 1992.
"A New Method of Johnson Noise Thermometry", by C.J. Borkowski et al., *Rev. Sci. Instrum.*, vol. 45, No. 2, (Feb. 1974) pp. 151-162.
"Thermocouple Continuity Checker," IBM Technical Disclosure Bulletin, vol. 20, No. 5, pp. 1954 (Oct. 1977).
"A Self-Validating Thermocouple," Janice C-Y et al., IEEE Transactions on Control Systems Technology, vol. 5, No. 2, pp. 239-253 (Mar. 1997).
*Instrument Engineers' Handbook*, Chapter IV entitled "Temperature Measurements," by T.J Claggett, pp. 266-333 (1982).
"emWare's Releases EMIT 3.0, Allowing Manufacturers to Internet and Network Enable Devices Royalty Free," 3 pages, PR Newswire (Nov. 4, 1998).
Warrior, J., "The IEEE P1451.1 Object Model Network Independent Interfaces for Sensors and Actuators," pp. 1-14, Rosemount Inc. (1997).
Warrior, J., "The Collision Between the Web and Plant Floor Automation," *6th*. WWW Conference Workshop on Embedded Web Technology, Santa Clara, CA (Apr. 7, 1997).
"Internal Statistical Quality Control for Quality Monitoring Instruments", by P. Girling et al., *ISA*, 15 pgs., 1999.
"Statistical Process Control (Practice Guide Series Book)", *Instrument Society of America*, 1995, pp. 1-58 and 169-204.
"Time-Frequency Analysis of Transient Pressure Signals for a Mechanical Heart Valve Cavitation Study," *ASIAO Journal*, by Alex A. Yu et al., vol. 44, No. 5, pp. M475-M479, (Sep.-Oct. 1998)
"Caviation in Pumps, Pipes and Valves," *Process Engineering*, by Dr. Ronald Young, pp. 47 and 49 (Jan. 1990).
"Quantification of Heart Valve Cavitation Based on High Fidelity Pressure Measurements," *Advances in Bioengineering* 1994, by Laura A. Garrison et al., BED-vol. 28, pp. 297-298 (Nov. 6-11, 1994).
"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).
"Developing Predictive Models for Cavitation Erosion," *Codes and Standards in a Global Environment*, PVP-vol. 259, pp. 189-192 (1993).
"Self-Diagnosing Intelligent Motors: A Key Enabler for Next Generation Manufacturing System," by Fred M. Discenzo et al., pp. 3/1-3/4 (1999).

(56) References Cited

OTHER PUBLICATIONS

"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).
"Experience in Using Estelle for the Specification and Verification of a Fieldbus Protocol: FIP," by Barretto et al., Computer Networking, pp. 295-304 (1990).
"Computer Simulation of H1 Field Bus Transmission," by Utsumi et al., Advances in Instrumentation and Control, vol. 46, Part 2, pp. 1815-1827 (1991).
"Progress in Fieldbus Developments for Measuring and Control Application," by A. Schwaier, Sensor and Acuators, pp. 115-119 (1991).
"Ein Emulationssystem zur Leistungsanalyse von Feldbussystemen, Teil 1," by R. Hoyer, pp. 335-336 (1991).
"Simulatore Integrato: Controllo su bus di campo," by Barabino et al., Automazione e Strumentazione, pp. 85-91 (Oct. 1993).
"Ein Modulares, verteiltes Diagnose-Expertensystem für die Fehlerdiagnose in lokalen Netzen," by Jürgen M. Schröder, pp. 557-565 (1990).
"Fault Diagnosis of Fieldbus Systems," by Jürgen Quade, pp. 577-581 (Oct. 1992).
"Ziele und Anwendungen von Feldbussystemen," by T. Pfeifer et al., pp. 549-557 (Oct. 1987).
"Profibus Infrastructure Measures," by Tilo Pfeifer et al., pp. 416-419 (Aug. 1991).
"Simulation the Time Behaviour of Fieldbus Systems," by O. Schnelle, pp. 440-442 (1991).
"Field Bus Networks for Automation Systems Containing Intelligent Functional Unites," by W. Kriesel et al., pp. 486-489 (1987).
"Field Buses for Process Interconnection with Digital Control Systems," Tecnología, pp. 141-147 (1990).
"Decentralised Systems with Real-Time Field Bus," Netzwerke, Jg. Nr.3 v. 14.3, 4 pages (1990).
"Process Measurement and Analysis," by Liptak et al., Instrument Engineers' Handbook, Third Edition, pp. 528-530, (1995).
"Improving Dynamic Performance of Temperature Sensors With Fuzzy Control Techniques," by Wang Lei et al., pp. 872-873 (1992).
"Microsoft Press Computer Dictionary" 2nd Edition, 1994, Microsoft Press. p. 156.
International Search Report from Application No. PCT/US01/40791 with international filing date of May 22, 2001.
International Search Report from Application No. PCT/US01/40782 with international filing date of May 22, 2001.
International Search Report from Application No. PCT/02/14560 with international filing date of May 8, 2002.
International Search Report from Application No. PCT/US02/14934 with international filing date of May 8, 2002.
"On-Line Tool Condition Monitoring System With Wavelet Fuzzy Neural Network," by Li Xiaoli et al., pp. 271-276 (1997).
"Optimal Design of the Coils of An Electromagnetic Flow Meter," by Michalski, A. et al., IEEE Transactions on Magnetics, vol. 34, Issue 5, Part 1, pp. 2563-2566 (1998).
"Magnetic Fluid Flow Meter for Gases," Popa, N. C., IEEE Transactions on Magnetics, vol. 30, Issue 2, Part 1-2, pp. 936-938 (1993).
"New Approach to a Main Error Estimation for Primary Transducer of Electromagnetic Flow Meter," by Michalski, A., IEEE Instrumentation and Measurement Technology Conference Proceedings, vol. 2, pp. 1093-1097 (1998).
"Additional Information From Flowmeters Via Signal Analysis," by Amadi-Echendu, J.E. et al., IEEE Instrumentation and Measurement Technology Conference Record, vol. 7, pp. 187-193 (1990).
International Search Report from Application No. PCT/US02/06606 with international filing date of Mar. 5, 2002.
International Search Report from Application No. PCT/US02/30465 with international filing date of Sep. 25, 2002.
"What is a weighted moving average?", Dau Stat Refresher, http://cne.gmu.edu/modules/dau/stat/mvavgs/wma_bdy.html. (1995).
"Statistics Glossary: Time Series Data", by Easton et al., http://www.stats.gla.ac.uk/steps/glossary/time_series.html , Sep. 1997.
"The Indicators Story", Sustainable Seattle, pp. 55-59, 1998.
"Detecting Regimes in Temperature Time Series", by Clemins et al., Artificial Neural Networks in Engineering, Proceedings, pp. 727-732, 2001.
"Re: Digital Filter-Moving Average", The Math Forumn, http://mathforum.org/discuss/sci.math/a/t/177212, Sep. 28, 1998.
"Notification of Transmittal of the International Search Report and the Written Opinion of the International Searching Authority", or the Declaration for PCT/US2004/017300.
"Invitation to Pay Additional Fees" for PCT/US2004/031678.
"Notification of Transmittal of the International Search Report or the Declaration", PCT/US2004/025291.
"Notification of Transmittal of the International Search Report or the Declaration", PCT/US2004/031678.
"Notification of Transmittal of the International Search Report or the Declaration", PCT/US2005/011385.
"Notification of Transmittal of the International Preliminary Report on Patenatability", PCT/US2004/031678.
"Notification of Transmittal of International Search Report and the Written Opinion", PCT/US2004/022736.
"Notification of Transmittal of the International Search Report", PCT/US00/14798.
"Invitation to Pay Additional Fees", PCT/US2004/031678.
"Notification of Transmittal of the International Search Report and the Written Opinion", PCT/US2004/022736.
"Notification of Transmittal of the International Search Report" PCT/US00/14798.
Office Action from U.S. Appl. No. 11/439,095.
"Invitation to Pay Additional Fees and Partial Search Report" for PCT/US2007/0011428, dated Oct. 8, 2008.
"Notification of Transmittal of the International Search Report and the Written Opinion of the International Searching Authority, or the Declaration" for PCT/US2008/009394 filed Aug. 5, 2008; 13 pages.
Eryurek et al., "Advanced Diagnostics Achieved with Intelligent Sensors and Fieldbus", 2001, Measuremnet and Control vol. 34, p. 293-311.
First Office Action from corresponding Chinese Application No. 200780035735.6, dated Mar. 15, 2011, 4 pages.
Rezabek, John "Field Device Complications", InTech, Apr. 1, 2006, HighBeam Research Online database, www.highbeam.com, 2 pages.
First Office Action from corresponding Chinese Application No. 200880102161.4, dated Jul. 6, 2011, 20 pages.
First Office Action from corresponding Russian Application No. 2010108301, dated Apr. 29, 2011, 16 pages.
Office Action from European Application No. 07836452.8, Dated Jun. 6, 2011.
Office Action from corresponding Japanese Application No. 2009-524611, dated Jul. 26, 2011, 7 pages.
Reeves-T., "Optimizing Process Equipment Performance", 2005, Emerson Process Management, 5 pages.
PlantWeb, "Improving Availability" Emerson White Paper, 2003, 15 pages.
PlantWeb, "Reducing Operations & Maintenance Costs", 2003, 18 pages.
Office Action from corresponding European Application No. 08795030.9, Dated Nov. 4, 2011.
International Search Report for PCT Application No. PCT/US2007/017301, dated Apr. 11, 2008, 4 pages.
Written Opinion for International Search Report for PCT Application No. PCT/US2007/017301, dated Apr. 11, 2008, 7 pages.
Transmittal of International Search Report and Written Opinion for PCT Application No. PCT/US2007/012317, dated Dec. 17, 2007, 11 pages.
Office Action (English translation) from Chinese Application No. 200780030039.6, dated Dec. 1, 2010, 8 pages.
Communication pursuant to Article 94(3) EPC for corresponding European Application No. 07 838 659.6-2206, dated Nov. 18, 2011, 7 pages.
Chinese Office Action (English translation) for corresponding Chinese Application No. 200780030039.6, dated Nov. 25, 2011, 8 pages.

(56) References Cited

OTHER PUBLICATIONS

Japanese Office Action (with English translation) for corresponding Japanese Application No. 2010-519967, dated Feb. 7, 2012, 11 pages.
Second Chinese Office Action for Chinese Application No. 200880102161.4, dated May 3, 2012, 6 pages.
Canadian Office Action for Canadian Patent Application No. 2,694,936, dated Oct. 16, 2012, 6 pages.
Rejection Decision from Chinese patent application No. 2007800357356, dated Mar. 28, 2012, 6 pages.
Second Office Action from Japanese patent application No. 2009530377, dated May 22, 2012, 5 pages.
Rejection Decision from Chinese patent application No. 2010-519967, dated Aug. 9, 2012, 9 pages.
Summons to attend oral proceeding from the corresponding European Patent Application No. 07838659.6, dated Jan. 29, 2013.
Decision of Rejection for European Patent Application No. 07838659.6, dated Jul. 3, 2013, 11 pages.
Reexamination Notification for Chinese Patent Application No. 2007800357356, dated May 3, 2013, 4 pages.
Decision of Rejection for Japanese Patent Application No. 2009530377, dated Apr. 30, 2013, 2 pages.
Summons to attend Oral Proceeding for European Patent Application No. 07838659.6, dated Jan. 29, 2013, 6 pages.
"Notification of Transmittal of International Search Report and the Written Opinion", PCT/US2006/037535, May 10, 2007.
"Notification of Transmittal of International Search Report and the Written Opinion", PCT/US2007/012317, Dec. 17, 2007.
Samson, Technical Information; HART Communication, Part 4 Communications; 40 pp, 1999.
"A Supervision Support System for Industrial Processes" by J. Penalva et al., IEEE, Oct. 1993, pp. 57-65.
"International Search Report" for related Application No. PCT/US2007/017301, Apr. 11, 2008.
"Written Opinion" for related Application No. PCT/US2007/017301, Apr. 11, 2008.
Office Action from Chinese Application No. 200780030039.6, dated Dec. 1, 2010.
U.S. Appl. No. 11/834,221, filed Aug. 6, 2007.
Notification of Transmittal of the International Search Report and Written Opinion for PCT/US2006/006899, filed Feb. 28, 2006.
Office Action from Chinese Application No. 200680005015.0, dated Aug. 15, 2008.
Second Office Action from Chinese Application No. 200680005015.0, dated Feb. 9, 2009.
Office Action from Japanese Patent Application No. 2010-519967, dated Feb. 7, 2012.
Canadian Office Action for Canadian App. No. 2,694,936, dated Oct. 16, 2012.
"Experimental and Numerical Investigation of Turbulent Flow Induced Pipe Vibration in Fully Developed Flow", by Pittard et al., Jul. 2004, Review of Scientific Instruments, vol. 75, No. 7, pp. 2393-2401.
"Wireless Sensing of Flow-Induced Vibrations for Pipeline Integrity Monitoring", by Awawdeh et al., 2006, IEEE, pp. 114-117.
Notification of Transmittal of the International Search Report and the Written Opinion of the International Searching Authority, or the Declaration in related PCT Application No. PCT/US2013/061170, filed Sep. 23, 2013, 9 pgs.
Canadian Office Action dated Feb. 19, 2014 in related application Serial No. 2,694,936, 7 pgs.
Notification of Transmittal of the International Search Report and the Written Opinion of the International Searching Authority, or the Declaration in related PCT Application No. PCT/US2013/044144, dated Apr. 1, 2014.
"Notification of Transmittal of the International Search Report and the Written Opinion of the International Searching Authority", or the Declaration for PCT/US2012/055733, dated Jul. 3, 2013.
Communication pursuant to Rules 161(1) and 162 EPC for European Patent Application No. 12780913.5-1557, dated May 22, 2014, 2 pages.
Official Action from Chinese Patent Application No. 201110303797.9, dated Apr. 22, 2014.
"Notification of Transmittal of the International Search Report and the Written Opinion of the International Searching Authority", or the Declaration for PCT/US027409, dated Oct. 17, 2012.
Communication regarding EP Application No. 12713813.9-1802, dated Nov. 8, 2013.

\* cited by examiner

PROCESS VARIABLE TRANSMITTER WITH ACCELERATION SENSOR

BACKGROUND OF THE INVENTION

The present invention relates to process variable transmitters. More specifically, the present invention relates to transmitters of the type which are used to control or monitor industrial processes.

Industrial processes are used in industrial manufacturing. There are various types of field devices which are used to monitor the process. For example, process variables such as pressure, flow, temperature and others can be sensed. In addition to using this information for monitoring the process, the process variables can be used to control the process.

Process variables are sensed using field devices known generally as process variable transmitters. In many instances, it is desirable to diagnose operation of the industrial process and identify the condition of the process and associated equipment. For example, diagnostics can be used to identify a failure in the industrial process, for example, so that failed components can be replaced. Other uses of diagnostics include identifying impending failure prior to its occurrence. This allows the component to be replaced or repaired at a desired time without necessarily shutting down the process.

Sensing vibrations is one method used for diagnosing process control devices. For example, a vibration sensor, such as an accelerometer, can be placed directly on a control device and can be used to sense vibration noise signals generated by the device. For example, the noise generated by a pump motor can be monitored. Vibrations are isolated and evaluated by identifying those which exceed an amplitude threshold or which have an abnormal frequency. This can be indicative of an actual or impending failure. Specific examples include sensors placed on a pump or a motor housing, discharge valves, or flanges associated with the control device. Another known diagnostic method is a manual inspection in which an operator listens for an abnormal sound from the control device. There is an ongoing need for improved diagnostic technology in industrial process control or monitoring systems for detecting failed components and components which have degraded or in the process of failing. Various techniques are shown in U.S. Pat. No. 6,601,005, filed Jul. 29, 2003 titled "Process Device Diagnostics Using Process Variable Sensor Signal; U.S. Publication No. 2005/0072239, published Apr. 7, 2005, titled "Process Device with Vibration Based Diagnostics" and U.S. Pat. No. 7,010,459, issued Mar. 7, 2006, titled "Process Device Diagnostics Using Process Variable Sensor Signal".

SUMMARY

A process variable transmitter for use in an industrial process control or monitoring system includes a transmitter housing and a process variable sensor having a sensor output related to a process variable. An accelerometer is associated with the transmitter, such as for example, the transmitter housing, process variable sensor, or other component and provides an accelerometer output related to acceleration. Diagnostic circuitry provides a diagnostic output as a function of the sensor output and the accelerometer output.

DETAILED DESCRIPTION

The present invention provides a diagnostic technique for detecting a failure, or predicting an impending failure or reduction in performance of a process device or a process component prior to the occurrence of the failure or reduced performance. With the present invention, vibrations in the process and/or process device are monitored. Vibrations are detected and used to predict a failure, an impending failure, or reduced performance of the process device or process component as a function of the sensed vibration signal and further as a function of a sensed process variable.

Figure 1:
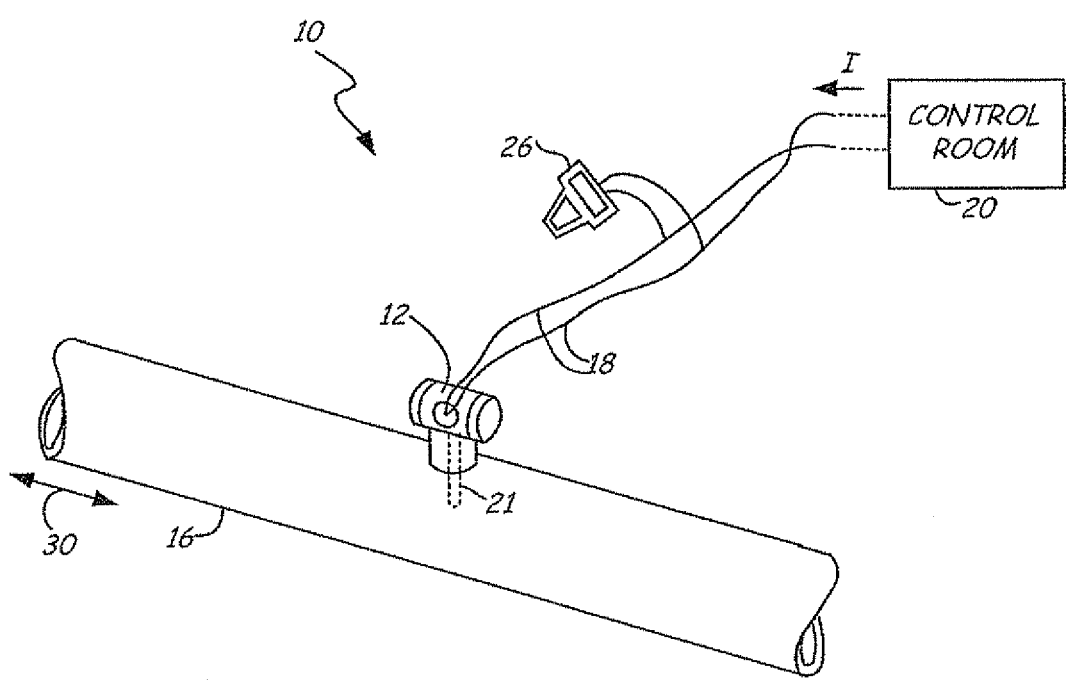
FIG. 1 is a diagram of an industrial process including a process transmitter coupled to process piping.

FIG. 1 is a diagram of process control system 10 which includes a transmitter 12 connected to process pipe 16. Transmitter 12 is coupled to a two-wire process control loop 18 which operates in accordance with the Fieldbus, Profibus or HART® standard. However, the invention is not limited to these standards or a two-wire configuration. Two-wire process control loop 18 runs between transmitter 12 and the control room 20 and a portable configuration unit 26 is illustrated in an embodiment in which loop 18 operates in accordance with the HART® protocol loop 18 can carry a current I which is representative of a sensed process variable. Additionally, the HART® protocol allows a digital signal to be superimposed on the current through loop 18 such that digital information can be sent to or received from transmitter 12. When operating in accordance with the Fieldbus standard, loop 18 carries a digital signal and can be coupled to multiple field devices such as other transmitters. In one configuration, the loop 18 comprises a wireless loop and the transmitter 12 communicates without the need for additional wiring.

Process variables are typically the primary variables which are being controlled in a process. As used herein, process variable means any variable which describes the condition of the process such as, for example, pressure, flow, temperature, product level, pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etch, which is adjusted by a controller or used to control the process. Additionally, a control signal means, calibration values, alarms, alarm conditions, the signal which is provided to a control element such as a valve position signal which is provided to a valve actuator, an energy level which is provided to a heating element, a solenoid on/off signal, etc., or any other signal which relates to control of the process. A diagnostic signal as used herein includes information related to operation of devices and elements in the process control loop, but does not include process variables or control signals. For example, diagnostic signals include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current; loop related parameters (such as control loop resistance, voltage, or current), or any other parameter which may be detected or measured in the system. Furthermore, process signal means any signal which is related to the process or element in the process such as, for example, a process variable, a control signal or a diagnostic signal. Process devices include any device which forms part of or couples to a process control loop and is used in the control or monitoring of a process.

It is understood that loop 18 is shown in one configuration and any appropriate process control loop may be used such as a 4-20 mA loop, 2, 3 or 4 wire loop, multi-drop loop and a loop operating in accordance with the HART®, Fieldbus or other digital or analog communication protocol including wireless communication protocols. In operation, transmitter 12 senses a process variable such as flow using sensor 21 and transmits the sensed process variable over loop 18.

In accordance with one embodiment of the present invention, a process device, such as transmitter 12 includes a vibration sensor configured to sense vibrations. The vibration sensor can be any type of vibration sensor such as an accelerometer but the invention is not limited to such a sensor. Diagnostic circuitry in transmitter 12, or at a remote location, monitors the sensed vibrations and a sensed process variable and is capable of diagnosing a failure or an impending failure. An output can be provided by transmitter 12, for example to control room 20 or communicator 26 over two-wire process control loop 18, which provides an indication of the failure of impending failure of a process component. Using this information, an operator can repair or replace a failed component, or repair or replace a component prior to its ultimate failure. This allows any maintenance of the process 10 to occur at a scheduled time or as desired. This can be particularly advantageous if the repair or replacement of the component requires the process 10 to be shut down. Further, some components can fail either catastrophically or in a manner which causes other components to be damaged, or cause the release of unsafe product to the environment. By providing an indication that the component may fail in the future, or predicting a time of ultimate failure, the component can be repaired or replaced prior to that ultimate failure.

Figure 2:
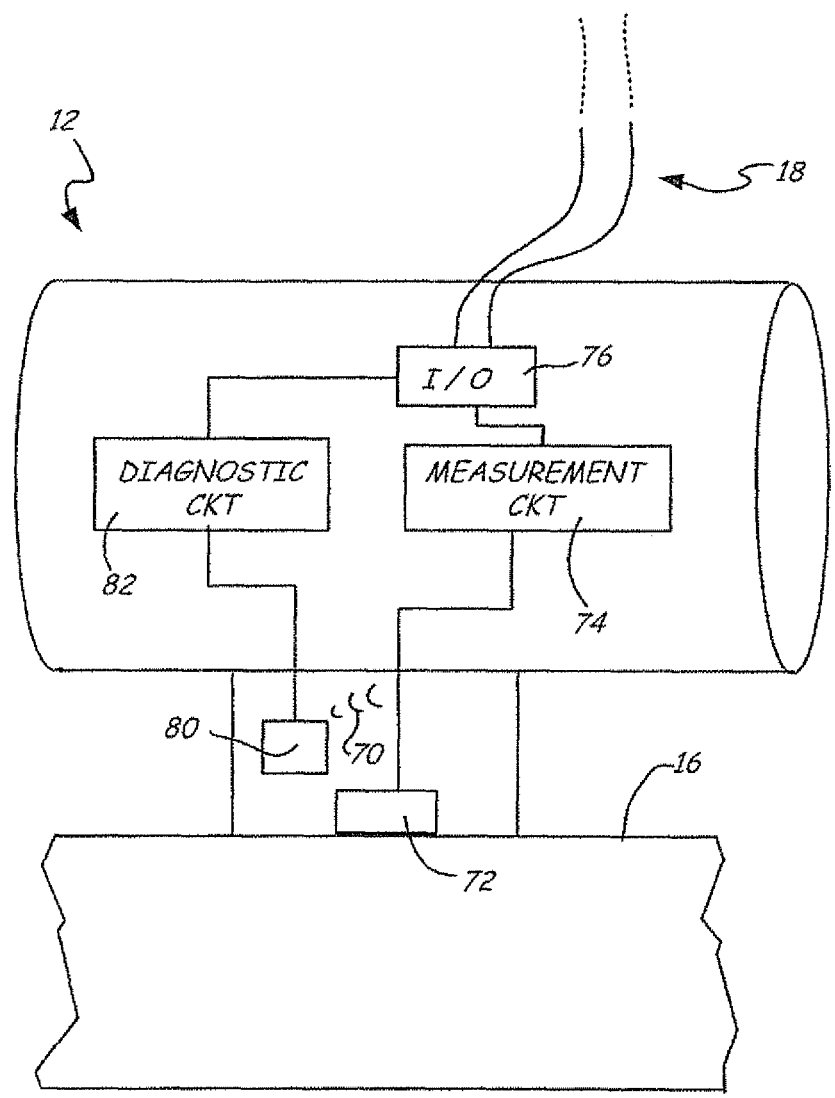
FIG. 2 is a block diagram of circuitry and components in the process transmitter of FIG. 1.

FIG. 2 is a diagram showing process transmitter 12 coupled to process piping 16. Vibrations 70 are shown traveling through the industrial process. For example, the vibration 70 may be carried by process piping 16, process fluid within piping 16, or other physical couplings, to the transmitter 12.

Transmitter 12 includes a process variable sensor 72. Process variable sensor 72 can be configured to sense any type of process variable such as flow, pressure, temperature, or others. Process variable sensor 72 couples to measurement circuitry 74 which provides a process variable signal to I/O circuitry 76. I/O circuitry 76 is configured to transmit information related to the sensed process variable over two-wire process control loop 18. In some embodiments, I/O circuitry 76 can also receive power through process control loop 18 which is used to completely power the circuitry and components of transmitter 12. Measurement circuitry 74 also couples to diagnostic circuitry 82 and provides a signal related to the sensed process variable to cavity 82.

A vibration sensor 80 in transmitter 12 is configured to sense vibrations 70 and provide a vibration sensor signal to diagnostic circuitry 82. Diagnostic circuitry 82 monitors the vibrations 70 sensed by vibration sensor 80 along with the sensed process variable from sensor 72 provided by measurement circuitry 74 and provides an output via I/O circuitry 76 which provides an indication of a failure or impending failure of a process component. Alternatively, I/O circuitry can provide a status output indicating that the transmitter is working properly.

In some embodiments, the vibration diagnostics of the present invention can be used to avoid or reduce plant downtime by predicting the impending loss of a measurement instrument or of a control instrument while there is still time to replace or repair the device. Vibration information can also be provided to other devices which are in communication with process control loop 18. Data compression algorithms can be used for such transmissions. A diagnostic indication can be provided on two-wire process control loop 18. For example, a HART status, Field Bus data, or other alerts can be transmitted over loop 18. Such an alert can be provided to the control room 20.

The vibration sensor 80 can be any type of vibration sensor. Many vibration sensors operate along a single axis and are capable of only sensing vibrations along that axis. However, in one embodiment additional sensors, or multi-axis sensors, are employed to sense vibrations along more than a single axis, or to profile vibration at various locations in the process device. Additional sensed vibrations can be used by the diagnostic circuitry 82 to provide her diagnostics. Additionally, vibration sensors 80 can be placed in more than one location in the process transmitter 12. These additional sensors can also be used to provide additional vibration based process diagnostics, either along or in combination with a sensed process variable. The scope of the diagnostics can be expanded by comparing or analyzing vibration measurements, either alone or along with a sensed process variable, from more than one process device located in the process system. The additional measurements can be used to provide information related to the overall health of the process or plant. Vibration measurements made near the connection of a process device to the process can be used to detect specific process disruptions such as air hammer from abrupt valve closure, cavitation, aggressive chemical reactions or other process disturbances as well as actual or impending failure of pumps, rotating equipment or similar types of failures.

Although the I/O circuitry 76, measurement circuitry 74 and diagnostic circuitry 82 are shown as separate components in FIG. 2, these circuit blocks can be implemented in shared circuitry and/or software. For example, many of these functions can be implemented in a digital processor. In addition to comparing sensed vibrations, or cumulative sensed vibrations, in conjunction with a process variable, to a fixed threshold, other diagnostic techniques can be employed by diagnostic circuitry 82. For example, an expert system can be implemented using if/then rules for use in diagnosing operation based upon vibrations and a sensed process variable. Diagnostics can be based upon the frequency spectrum of sensed vibrations and process variables, and more complex processing can be employed such as neural networks, fuzzy logic, etc.

Figure 3:
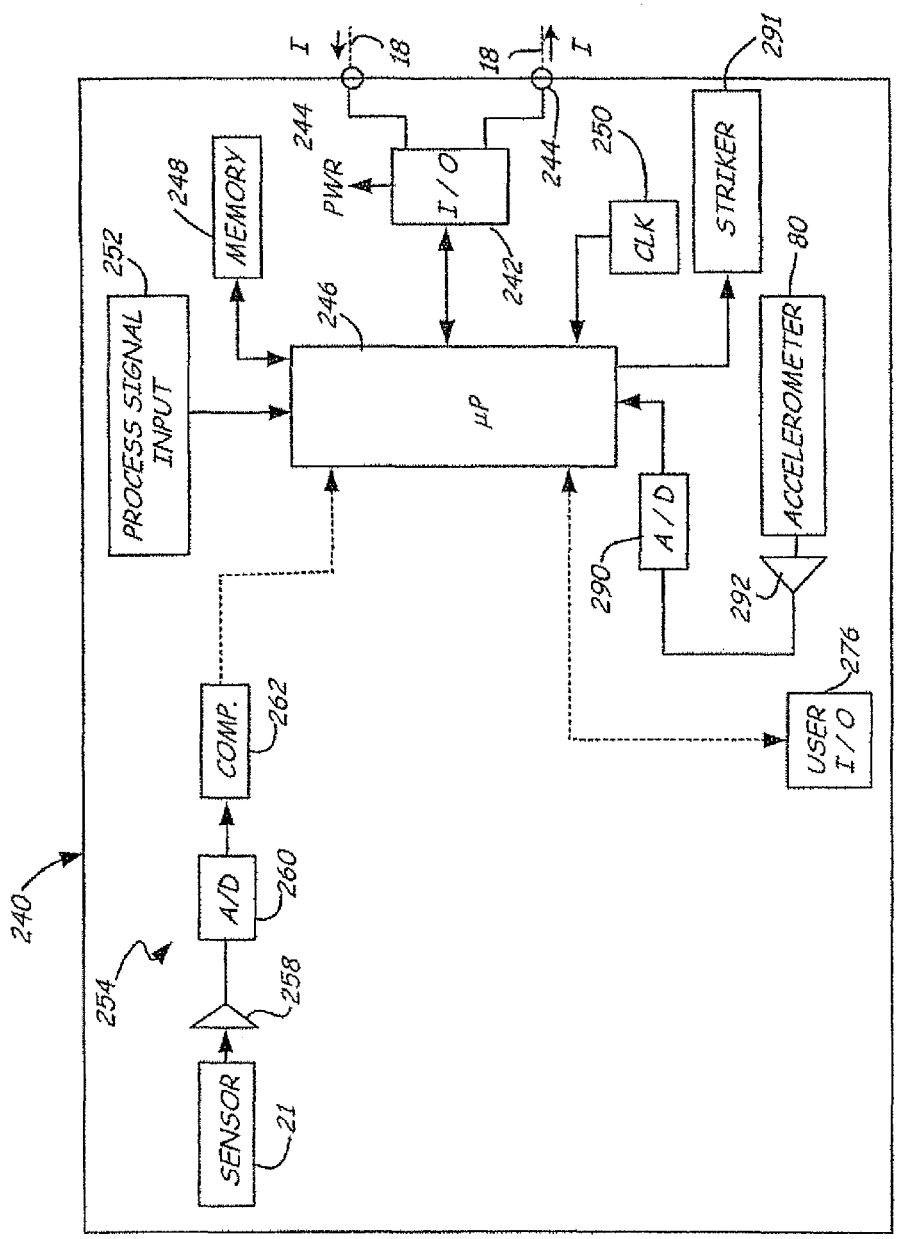
FIG. 3 is a simplified block diagram of a process device for use in implementing the present invention.

FIG. 3 is a block diagram of a process device 240 forming part of loop 18. Device 240 is shown generically and may comprise any process device used to implement the vibration diagnostics such as transmitter 12. Process device 240 includes I/O circuitry 242 coupled to loop 18 at terminals 244. Device 240 includes microprocessor 246, coupled to I/O circuitry 242, memory 248 coupled to microprocessor 246 and clock 250 coupled to microprocessor 246. Microprocessor 246 receives a process signal input 252. Process signal input block 252 signifies input of any process signal and the process signal input may be a process variable, or a control signal and may be received from loop 18 using I/O circuitry 242 or may be generated internally within process device 240.

Process device 240 includes a sensor input channel 254. Sensor input channel 254 includes sensor 21 which senses a process variable and provides a sensor output to amplifier 258 which has an output which is digitized by analog to digital converter 260. Channel 254 is typically used in transmitters such as transmitter 12. Compensation circuitry 262 compensates the digitized signal and provides a digitized process variable signal to microprocessor 246.

In one embodiment, I/O circuitry 242 provides a power output used to completely power some or all of the other circuitry in process device 240 using power received from loop 18. Typically, field devices such as transmitter 12, or controller 22 are powered from loop 18 while communicator 26 or control room 20 has a separate power source. As described above, process signal input 252 provides a process signal to microprocessor 246. The process signal may be a process variable from sensor 21, the control output provided to a control element, a diagnostic signal sensed by sensor 80, or a control signal, process variable or diagnostic signal received over loop 18, or a process signal received or generated by some other means, such as another I/O channel.

A user I/O circuit 276 is also connected to microprocessor 246 and provides communication between device 240 and a user. Typically, user I/O circuit 276 includes a display and/or audio for output, and a keypad or other interface for input. I/O circuit 276 can be used to allow a user to monitor or input process signals, such as process variables, control signals (setpoints, calibration values, alarms, alarm conditions, etc.).

FIG. 3 also illustrates vibration sensor 80 which can be an individual sensor, or it can comprise multiple sensors or components. In one embodiment, sensor 80 couples to microprocessor 246, for example, through an analog to digital converter 290 and an amplifier 292. Microprocessor 246 can monitor the sensed vibrations, along with a process signal such as a sense process variable, and provide an indication of a failure or impending failure of a process component. For example, the microprocessor can compare the relationship between the sensed vibration along with the process variable to a baseline value or a nominal value. Similarly, the process variable output can be compared to the sensed vibration to identify a faulty process variable reading. This information can be stored in memory 248. The baseline and nominal values can change based upon the mode of operation of the process, or other factors. The baseline can be a particular frequency spectrum or signature and can be based upon observed history of process operation. Further, the diagnostics performed by microprocessor 246 can be based upon trends in the sensed vibrations and sensed process variable. For example, an increase, either gradual or suddenly over time, or periodic spikes or other anomalies in the sensed vibrations and sensed process variable, can be an indication of a failure or an impending failure of a process component. Similarly, if the relationship between the sensed vibrations and sensed process variable suddenly changes, the microprocessor 246 can provide a diagnostic output indicating that a process component may fail or has failed. These values, trends, or training profiles can also be stored in memory 248. The diagnostics can be based upon a comparison, or more complex mathematical techniques such as observing averages or rolling averages of measurements, fuzzy logic techniques, neural network techniques, or expert system techniques based upon a series of rules and/or threshold comparison. In various embodiments, the ability of the present invention to provide predictive diagnostics can be advantageous as it provides time for service personnel to service the process component prior to its ultimate failure.

FIG. 3 also illustrates a striker 291 coupled to microprocessor 246. Striker 291 can be an optional component and can comprise any element which is configured to impart an acceleration to the transmitter 240. For example, a spring-loaded hammer can be activated by the microprocessor, a solonoid, a motor with an offset weight, etc. This can provide a known acceleration signal to the transmitter 240 and used for diagnostic or in configurations in which external acceleration sources are not available.

The diagnostic output of the present invention can be used to provide an output signal, provide a local indication to an operator, or provide a communication signal for transmission to a control room or other diagnostic annunciation.

As discussed above, the diagnostics are a function of techniques which employ a sensed vibration and a sensed process variable. For example, the diagnostics can utilize trends in the relations between the signals over a period of time. This information can be correlated, with respect to the process variable signal, with wear of bearings or pump components. Additionally, the diagnostics circuitry can be used to correlate vibration signals and sensed process variable with various procedures or occurrences which occur during operation of the industrial process. For example, an aggressive chemical reaction may have a particular vibration signature and a related change in the process variable. In some embodiments, the relationship between the sensed process variable and vibrations, for example a changing relationship between the two, can provide an indication of a diagnostic condition such as a component which is failing or otherwise changing in some manner.

In one aspect, the output from the vibration sensor is used to validate operation of the process variable sensor. For example, a vibration experienced by the pressure transmitter may be correlated to a change in the measured process variable. This relationship can be monitored over time and used to validate proper operation of the process variable sensor.

The vibration sensor 80 can be any appropriate vibration sensor. One known vibration detection and measurement sensor is an accelerometer. There are a number of different accelerometer technologies which are currently employed including capacitive, electrodynamic, piezoelectric, and others. The accelerometer produces an output signal that is related to the sensed vibration. The output signal can have a linear or other relationship to the strength of the vibration or the frequency of the vibration. Another example diagnostics sensor can be embodied in a MEMS configuration in which a cantilever is utilized to sense vibrations.

Piezoelectric accelerometers are relatively rugged and have a wide signal bandwidth, in the order of tens of kilohertz, covering much of the audio range. One example sensor is available from PCB Piezoelectronics and identified as the IMI Sensor Series 660, which is a family of low cost embeddable accelerometers. Various configurations are available including two wire with and without signal processing and three wire low power. For example, the low power configuration operates over an extended temperature range and can be mounted directly to processes which undergo a wide temperature variation. An excitation voltage is applied, for example between 3 and 5 volts DC and the current throughout the sensor is on the order of 750 microamperes.

Another example accelerometer is the MMA series available from Motorola. These accelerometers include various configurations such as surface mount integrated circuit packages, temperature compensation, integral signal conditioning and filtering, self testing and fault latch capabilities. These accelerometers use a capacitive sensing technique that can be modeled as two stationary plates with a movable plate placed therebetween. The center plate is deflected from its rest position when the system is subject to acceleration.

Any of appropriate type of accelerometer may be used with the present invention. For example, a capacitive accelerometer uses a metal beam or micromachine feature which produces a variable capacitance which changes in response to acceleration. A piezoelectric electric sensor uses a piezoelectric monitor mounted to the device. Acceleration is related to a voltage output from the piezoelectric crystal. A piezo resistant sensor can, for example, use a beam or micromachine feature having a resistance which changes in response to acceleration. A hall defect sensor uses a configuration in which motion is converted to an electrical signal by sensing a change in magnetic fields. Various types of tri-access accelerometers can be used. For example, one such accelerometer is the Okidata ML8950. Another example device is available from analog devices as the AVXL330.

Using a tri-access accelerometer, a transmitter in accordance with the present invention can be configured to utilize two separate measurements for diagnostics. The transmitter can utilize the output from the accelerometer as well as the output from the process variable sensor, such as a pressure sensor. The signals from these two devices can be compared to generate unique system diagnostics. For example, in a pressure transmitter, an accelerometer can be incorporated. The accelerometer can be activated using a manual input, such as being struck with a hammer or other heavy object by an operator. The impact can be directed along an axis of a sensed diaphragm of a pressure sensor. This uncalibrated impact will cause both the accelerometer to measure acceleration and the pressure sensor to measure a pressure pulse. If both outputs are detected, diagnostics can confirm proper operation of the device.

As a further embodiment of the configurations described above, the waveforms or other aspects of the output of the process variable sensor and the accelerometer can be compared. For example, in some configurations, a linear relationship can be observed between the output from the pressure sensor and the output from the accelerometer in response to a strike or other impact on the transmitter. A variation of these responses can provide an indication of a failure, for example, a loss of oil fill fluid.

In one example, a spring-loaded punch is used to provide a calibrated strike to the device. However, any desired type of calibrated strike can be used. In such a configuration, the magnitude of the strike can be used in a diagnostic algorithm along with the outputs from the process variable sensor and the accelerometer. In a further configuration, multiple calibrated strikes are applied for use in the diagnostics. For example, strikes of differing magnitudes can be used and the resultant changes in the process variable and the output from the accelerometer can be compared.

In another example configuration, ambient energy is used as the source of the "strike". For example, a water hammer effect, pump pulsation or machinery vibrations can be used. For example, two different water hammers can result in two different comparisons that can used as a calibration check. It can also provide an indication that the transmitters are functioning in accordance with performance specifications.

In another example, a constant vibration causes an offset in the sensor process variable such as an offset in a sensed pressure. For example, a vibration in a wet leg which couples a pressure sensor to a process causes the pressure sensor to indicate an increased pressure. In some configurations, the pressure sensor acts as a low pass filter and rectifier such that the pulsation appears as a pressure offset. The process variable, along with the monitored acceleration, can be used to perform diagnostics. Further, the monitored acceleration can also be used to compensate the process variable such that the offset caused by the vibrations are removed from the process variable measurements using, for example, microprocessor 246 shown in FIG. 3.

The accelerometer 80 can be mounted in any appropriate location. The accelerometer can be mounted to the housing of the transmitter, or, for example, directly to the process variable sensor such as directly to a pressure sensor. However, the pressure sensor is typically isolated in a pressure module and, in some configurations, may be isolated from vibrations such as strikes applied to the transmitter. The housing and placement of the accelerometer can be designed to enhance the susceptibility to particular types of vibrations, or other considerations. High speed data capturing techniques can be utilized in order to obtain a detailed profile of acceleration sensed by the acceleration sensor.

Figure 4:
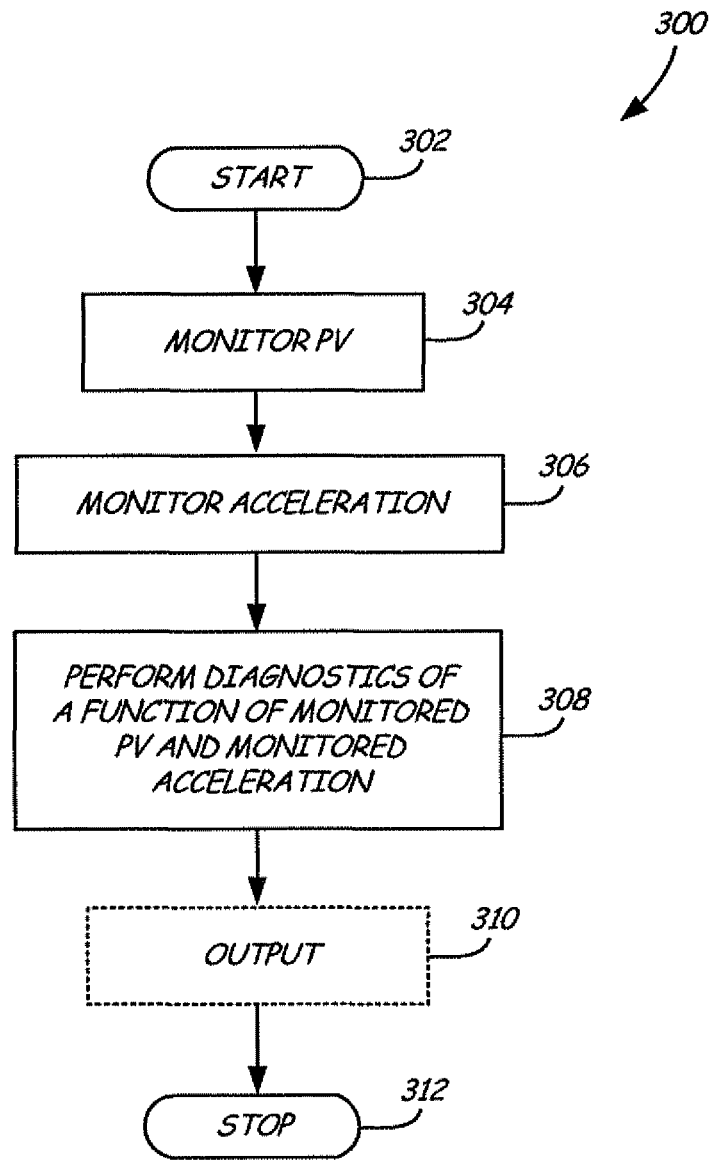
FIG. 4 if a block diagram showing simplified steps in accordance with one configuration of the present invention.

FIG. 4 is a simplified block diagram 300 of steps in accordance with one embodiment of the invention. Flow chart 300 is initiated at block 302 and the process variable is monitored at block 304. At block 306 acceleration is monitored. Blocks 304 and 306 can occur sequentially, in parallel, in reverse order or at any time including partially overlapping monitor periods. At block 308, diagnostics are performed as a function of the monitored process variable as well as monitored acceleration. These diagnostics can be performed in microprocessor 246 shown in FIG. 3 based upon programming instructions stored in memory 248. Diagnostics can be in accordance with any appropriate technique in which the two monitored values are compared in order to determine a condition, or impending condition, of process components, operation of the process, operation of devices or elements within the process, etc. Examples include rule based techniques, fuzzy logic techniques, neural network techniques, artificial intelligence techniques or others. In one configuration, the monitored acceleration is used by microprocessor 246 to compensate for errors in the measured process variable which are introduced due to acceleration of the transmitter or components coupled to the transmitter. For example, a offset in the sensed process variable can be removed in some configurations by the use of monitored acceleration. At block 310, an optional output is provided related to the diagnostics. This output can be transmitted to a remote location as desired, for example, by communicating over two-wire process control loop 18, or using other communication techniques such as RF or wireless techniques. Additionally, the output can be provided locally to an operator or locally to nearby equipment such as test equipment either through a wired or a wireless connection. At block 312, the procedure stops and is optionally repeated by returning to block 302. In one configuration, monitor acceleration block 306 includes activating a striker 391, or other acceleration source.

In one configuration, the steps illustrated in FIG. 4 can be activated based upon user input. For example, an operator can initiate operation of block diagram 300 by providing an appropriate signal to transmitter 340 either through communication using two-wire process control loop 18 or other techniques. In such a configuration, the device can be configured to instruct the operator to apply acceleration to the transmitter 240 at block 306 while the acceleration is monitored. For example, an operator can be instructed to strike the transmitter at a particular location or along a particular axis.

The present invention provides a number of techniques for performing diagnostics or compensation in a process device of a process control monitoring system. For example, external influences, either artificial, such as a hammer strike, or ambient, such as a water hammer or machinery vibration, which causes acceleration of the device, can be measured using an accelerometer. The effect of this acceleration is measured using an accelerometer, for example, a single axis, a dual axis, or a tri-axis accelerometer and a process variable sensor such as a pressure sensor. These two measurements can be used to diagnose operation, for example, to verify proper operation of the transmitter. In other configurations, the two measured signals are manipulated, for example, the ratios of the two signals can be observed and compared with the magnitude of calibrated external influence in order to verify transmitter operation. Using a ratio of the two signals along with the magnitude of the two signals, and the magnitude of an external influence along with ratios of the magnitude of the external influence, further techniques can be used to verify operation of the transmitter. In addition to verification of operation, calibration and compensation can be performed in a real time using the acceleration signal. By monitoring and analyzing signals, the transmitter can provide a notification or alert regarding status. The accelerometer can be positioned as desired, for example, fabricated adjacent the process variable sensor such as pressure sensor, or electronics associated with the sensor. For example, a capacitance based accelerometer can be integrated in an existing or modified analog to digital converter such as a capacitance to digital integrated circuit. The tri-axis accelerometer can be used to perform multiple functions including measurement of vibration as a diagnostic tool, measurement of inclination of the device as a means for automatically compensate head effects in pressure measurements, measurement of an influence on the device compared to its influence on the process variable sensor for use in transmitted verification, and/or measurement of acceleration to compensate for acceleration pressure offsets. A source of acceleration can be integrated into the device such as a spring-loaded punch mechanism or the like. The mechanism can be actuated by an operator, or it can be automatically actuated by electrical circuitry in the transmitter. In another configuration, a mechanical or pressure external influence integrated into the process connection which couples the transmitter to the industrial process. The accelerometer can be attached directly to the process variable sensor to create a more predictable relationship between the two signals.

In one configuration, the accelerometer can be configured to measure a time based periodicity of the acceleration input. If the acceleration affects process variable measurement, such as pressure measurement, accuracy, then measurements which are taken during "quiet" intervals can be considered as providing higher accuracy. Such a system could, for example, hold the most recent "good" value when the accelerometer measures a large acceleration input which may cause an error in the measurement. In another example, in some configurations, an increase in the measured process variable, for example, an increase in a flow rate, also corresponds to an increase in vibrations, for example, increased pump pulsations or higher magnitude pipe vibrations. The signals from the process variable "pressure" sensor in the accelerometer can be compared as an additional diagnostic to provide more confidence in the measured process variable.

Although the present invention has been described with reference to preferred embodiments, workers skilled in the art will recognize that changes may be made in form and detail without departing from the spirit and scope of the invention. In some embodiments, the invention can be embodied in any type of process device. Any type of processor can be used including capacitive based accelerometer using a metal beam or micro machine feature which produces a changed capacitance related to acceleration, piezoelectric sensors using a crystal mounted to a mass, piezoelectric sensors, for example, in which a beam has a resistance which changes based upon acceleration, Hall effect based sensors which are based upon changing magnetic fields, etc. The diagnostic circuitry of the present invention can be embodied in any appropriate component. For example, the circuitry can be embodied in a microprocessor and associated components along with programming instructions or can comprise other components or embodiments. Example acceleration sensors include capacitive, electrodynamic, piezoelectric and Micro-Electro-Mechanical Systems (MEMS).

What is claimed is:

1. A process variable transmitter for use in an industrial process control or monitoring system, comprising:
    a process variable sensor in the process variable transmitter having a process variable sensor output related to a process variable;
    an accelerometer in the process variable transmitter and which is separate from the process variable sensor coupled to the transmitter having an accelerometer output related to acceleration;
    output circuitry configured to provide an output related to the sensed process variable; and
    diagnostic circuitry configured to:
        determine a ratio between the process variable output and the accelerometer output;
        diagnose a condition in the process based upon the ratio of the process variable sensor output and the accelerometer output and responsively provide a diagnostic output indicative of a diagnostic condition in the process.

2. The process variable transmitter of claim 1 including a transmitter housing wherein the accelerometer is coupled to the transmitter housing.

3. The process variable transmitter of claim 1 wherein the accelerometer is adjacent the process variable sensor.

4. The process variable transmitter of claim 1 wherein the accelerometer comprises a tri-axis accelerometer.

5. The process variable transmitter of claim 1 wherein the process variable sensor comprises a pressure sensor.

6. The process variable transmitter of claim 1 including communication circuitry configured to couple to a process control loop.

7. The process variable transmitter of claim 6 wherein the diagnostic output from the diagnostic circuitry is transmitted on the process control loop.

8. The process variable transmitter of claim 6 wherein the diagnostic output is related to failure of a process component.

9. The process variable transmitter of claim 6 wherein the diagnostic output is related to degradation in performance of a process component.

10. The process variable transmitter of claim 6 wherein the diagnostic output is related to an impending failure of a process component.

11. The process variable transmitter of claim 1 wherein the diagnostic output is used to compensate the process variable.

12. The process variable transmitter of claim 1 wherein the diagnostic output is based upon rules.

13. The process variable transmitter of claim 1 wherein the diagnostic circuitry implements a neural network, or fuzzy logic.

14. The process variable transmitter of claim 1 wherein the acceleration sensor is selected from a group of acceleration sensors including of capacitive, electrodynamic, piezoelectric and Micro-Electro-Mechanical Systems (MEMS).

15. The process variable transmitter of claim 1 wherein the diagnostic circuitry is configured to control an acceleration applied to the process control transmitter.

16. The process variable transmitter of claim 15 including a striker configured to impact the transmitter.

17. The process variable transmitter of claim 1 wherein the accelerometer is configured to sense an acceleration applied by an operator.

18. The process variable transmitter of claim 1 wherein the accelerometer is configured to sense a calibrated acceleration applied to the transmitter.

19. The process variable transmitter of claim 1 wherein the diagnostic circuitry is configured to compare acceleration from more than one calibrated accelerations applied to the transmitter.

20. The process variable transmitter of claim 1 wherein the process variable transmitter is configured to control an output of the process variable based upon sensed acceleration.

21. The process variable transmitter of claim 1 wherein the accelerometer is configured to sense an ambient acceleration.

22. The process variable transmitter of claim 21 wherein the ambient acceleration is from at least one of a water hammer, pump pulsation and machinery acceleration.

23. The process variable transmitter of claim 1 wherein the diagnostic circuitry is configured to compensate the output from the process variable based upon a sensed static acceleration.

24. The process variable transmitter of claim 1 wherein the accelerometer provides an output for use in one of diagnostics, process variable compensation, or verification of operation.

25. The process variable transmitter of claim 1 including a memory configured to store the process variable and wherein the process variable transmitter provides an output based upon the process variable stored in the memory as a function of sensed acceleration.

26. The process variable transmitter of claim 1 wherein the diagnostic output is a function of a historical relationship between the sensory output and the accelerometer output.

27. A method of diagnosing a condition in an industrial process using a process variable transmitter in an industrial process control system, comprising:
    sensing accelerations applied to the transmitter using an accelerometer located in the transmitter and providing an accelerometer output;
    measuring a process variable with a process variable sensor separate from the accelerometer and located in the transmitter and providing a process variable sensor output;
    providing an output related to the sensed pressure variable;
    determining a ratio of the process variable sensor output and the accelerometer output;
    diagnosing a condition of the industrial process based upon the ratio of the process variable sensor output and the accelerometer output.

28. The method of claim 27 wherein the accelerometer is coupled to a transmitter housing.

29. The method of claim 27 wherein the accelerometer is adjacent a process variable sensor.

30. The method of claim 27 wherein the accelerometer comprises a tri-axis accelerometer.

31. The method of claim 27 wherein the sensed process variable comprises pressure.

32. The method of claim 27 including transmitting diagnostic information on a process control loop.

33. The method of claim 27 wherein the diagnosed operation is related to an impending failure of a process component.

34. The method of claim 27 including compensating the process variable based upon the step of diagnosing.

35. The method of claim 27 wherein the diagnosing is based upon rules.

36. The method of claim 27 wherein the diagnosing is based upon a neural network, or fuzzy logic.

37. The method of claim 27 wherein the acceleration sensor is selected from a group of acceleration sensors including of capacitive, electrodynamic, piezoelectric and Micro-Electro-Mechanical Systems (MEMS).

38. The method of claim 27 including controlling an acceleration applied to the transmitter.

39. The method of claim 27 including sensing an acceleration applied by an operator.

40. The method of claim 27 including sensing a calibrated acceleration applied to the transmitter.

41. The method of claim 27 including storing the process variable and wherein providing an output based upon the stored process variable as a function of sensed acceleration.

* * * * *